(12) United States Patent
Manju

(10) Patent No.: US 11,781,470 B2
(45) Date of Patent: Oct. 10, 2023

(54) CONTROL DEVICE FOR INTERNAL COMBUSTION ENGINE

(71) Applicant: TOYOTA JIDOSHA KABUSHIKI KAISHA, Toyota (JP)

(72) Inventor: Yoshinori Manju, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 43 days.

(21) Appl. No.: 16/139,110

(22) Filed: Sep. 24, 2018

(65) Prior Publication Data

US 2019/0162110 A1 May 30, 2019

(30) Foreign Application Priority Data

Nov. 24, 2017 (JP) ................. 2017-225871

(51) Int. Cl.
| | |
|---|---|
| F02B 29/04 | (2006.01) |
| F02M 26/17 | (2016.01) |
| F02M 26/33 | (2016.01) |
| F02M 26/28 | (2016.01) |
| F02D 41/00 | (2006.01) |
| F02D 41/04 | (2006.01) |
| F01P 3/12 | (2006.01) |

(52) U.S. Cl.
CPC ............ *F02B 29/0437* (2013.01); *F01P 3/12* (2013.01); *F02B 29/0443* (2013.01); *F02B 29/0493* (2013.01); *F02D 41/0055* (2013.01); *F02D 41/042* (2013.01); *F02M 26/17* (2016.02); *F02M 26/28* (2016.02); *F02M 26/33* (2016.02); *F01P 2060/02* (2013.01); *F02D 2200/021* (2013.01)

(58) Field of Classification Search
CPC ..... F02B 29/0437; F02B 29/0443; F01P 3/12; F02D 41/0055; F02D 41/042; F02M 26/17; F02M 26/33
USPC .......................................... 123/542
See application file for complete search history.

(56) References Cited

U.S. PATENT DOCUMENTS

2015/0369179 A1* 12/2015 Hotta ................. F02M 26/24
60/599

FOREIGN PATENT DOCUMENTS

| EP | 2 957 744 A1 | 12/2015 | |
|---|---|---|---|
| JP | 2001-3747 A | 1/2001 | |
| JP | 2001003747 A * | 1/2001 | ............ F02M 26/28 |
| JP | 2010-59921 | 3/2010 | |

(Continued)

*Primary Examiner* — Phutthiwat Wongwian
*Assistant Examiner* — Omar Morales
(74) *Attorney, Agent, or Firm* — Oblon, McClelland, Maier & Neustadt, L.L.P.

(57) ABSTRACT

Provided is a control device for an internal combustion engine that includes: a water-cooled cooler (intercooler) arranged at at least one of a portion of an intake air passage located on the upstream side of an intake port and an EGR passage; and a water pump configured to supply a cooling water with the cooler. The control device is configured: to execute a water supply operation that supplies the cooling water with the cooler by actuating the water pump when its execution condition which includes a requirement that a cooler temperature is higher than a cooling water temperature is met during stop of the internal combustion engine; and not to execute the water supply operation when the cooler temperature is lower than or equal to the cooling water temperature during stop of the internal combustion engine.

9 Claims, 16 Drawing Sheets

(56) References Cited

FOREIGN PATENT DOCUMENTS

| | | |
|---|---|---|
| JP | 2012-197706 A | 10/2012 |
| JP | 2013-7338 | 1/2013 |

* cited by examiner

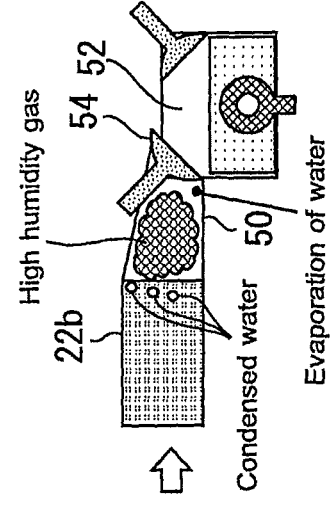
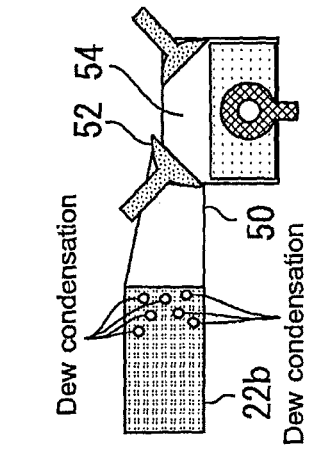
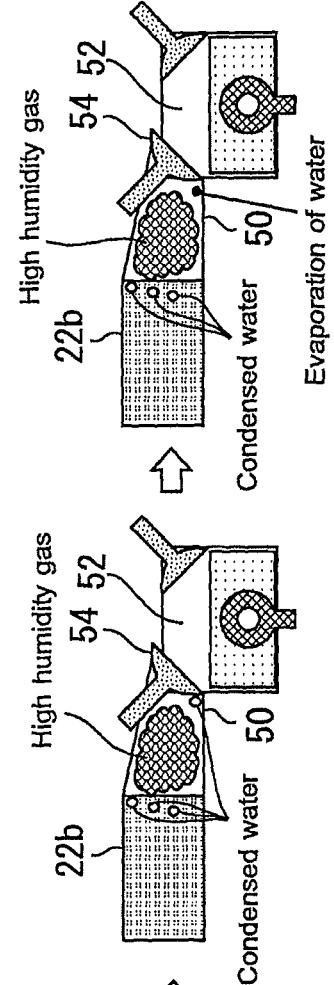
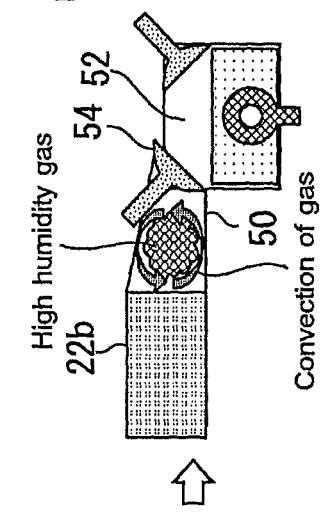
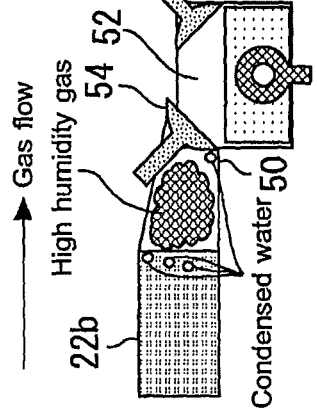
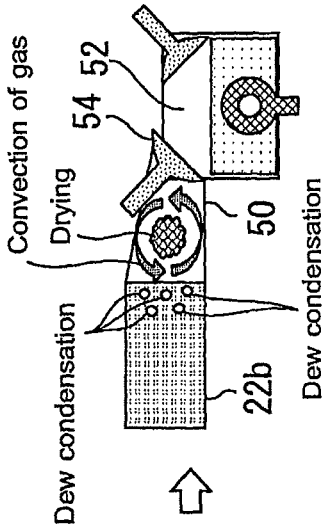

CONTROL DEVICE FOR INTERNAL COMBUSTION ENGINE

CROSS-REFERENCE TO RELATED APPLICATION

This application is based on and claims the benefit of Japanese Patent Application No. 2017-225871, filed on Nov. 24, 2017, which is incorporated by reference herein in its entirety.

BACKGROUND

Technical Field

The present disclosure relates to a control device for an internal combustion engine, and more particularly to a control device for controlling an internal combustion engine that includes a water-cooled cooler arranged at at least one of a portion of an intake air passage located on the upstream side of an intake port and an EGR passage.

Background Art

For example, JP 2010-059921 A discloses an EGR control device for an internal combustion engine.

According to this EGR control device, an EGR valve and a throttle valve are controlled such that, when an engine stop request is made, EGR gas in a passage through which the EGR gas flows is scavenged. This can prevent the combustion at the time of a re-start of the internal combustion engine from becoming unstable due to a condensed water that is produced from a residual EGR gas during stop of the internal combustion engine.

SUMMARY

If the wall surface temperature of an intake port decreases during stop of an internal combustion engine, dew condensation of moisture in a gas in the intake port may be produced. As a result, there is a concern that an intake valve or a valve seat may become eroded or freeze.

The present disclosure has been made to address the problem described above, and an object of the present disclosure is to provide a control device for an internal combustion engine that can reduce the occurrence of the dew condensation of moisture in an intake port during stop of the internal combustion engine.

A control device for controlling an internal combustion engine according to the present disclosure is configured to control an internal combustion engine that includes:

a water-cooled cooler arranged at at least one of a portion of an intake air passage located on an upstream side of an intake port and an EGR passage; and a water pump configured to supply a cooling water with the cooler.

The control device is configured:

to execute a water supply operation that supplies the cooling water with the cooler by actuating the water pump when its execution condition which includes a requirement that a cooler temperature that is a temperature of the cooler is higher than a cooling water temperature that is a temperature of the cooling water that flows into the cooler is met during stop of the internal combustion engine; and not to execute the water supply operation when the cooler temperature is lower than or equal to the cooling water temperature during stop of the internal combustion engine.

The control device may be configured to end the water supply operation when, after the water supply operation starts, its end condition is met which includes a requirement that the cooler temperature is lower than or equal to the cooling water temperature, and to restart the water supply operation when the execution condition is met again thereafter.

The execution condition of the water supply operation may include a requirement that a time change rate of the cooler temperature is positive as well as the requirement that the cooler temperature is higher than the cooling water temperature.

An end condition of the water supply operation may include a requirement that the time change rate of the cooler temperature is zero or substantially zero.

The control device may be configured, until the time change rate of the cooler temperature shifts to a negative value, to repeatedly execute the water supply operation that utilizes its ending condition which includes a requirement that the time change rate of the cooler temperature is zero.

The execution condition of the water supply operation may include a requirement that there is a time change of the cooler temperature as well as the requirement that the cooler temperature is higher than the cooling water temperature.

An end condition of the water supply operation may include a requirement that a time change rate of the cooler temperature is zero, and a requirement that the cooler temperature is equal to or substantially equal to an outside air temperature or the cooling water temperature.

An end condition of the water supply operation may include a requirement that a time change rate of the cooler temperature is lower than or equal to a negative threshold value, or a requirement that the cooler temperature is equal to or substantially equal to the cooling water temperature or an outside air temperature.

The control device may be configured to start the water supply operation when the execution condition is met after the cooler temperature converges to an outside air temperature after stop of the internal combustion engine.

According to the control device for an internal combustion engine of the present disclosure, if the water supply operation is executed when the wall surface temperature of the intake port is equal to or higher than the cooler temperature during stop of the internal combustion engine, the cooler temperature is lowered and a temperature difference (=wall surface temperature of intake port−cooler temperature) can thus be increased. Therefore, an environment in which the dew condensation of moisture is easier to be produced on the side of the cooler than on the side of the intake port is achieved. Moreover, even when the wall surface temperature of the intake port becomes lower than the cooler temperature during stop of the internal combustion engine, at least a temperature difference (=cooler temperature−wall surface temperature of intake port) that is opposite in sign to the temperature difference described above can be decreased by the use of execution of the water supply operation. Therefore, even when the wall surface temperature becomes lower than the cooler temperature as just described, it becomes possible to at least prevent the dew condensation of the moisture from being easier to be produced on the side of the intake port as compared to the side of the cooler. As described above, according to the control device of the present disclosure, the occurrence of the dew condensation of the moisture in the intake port during stop of the internal combustion engine can be reduced. As a result, the erosion or freezing of an intake valve or a valve seat can be reduced.

BRIEF DESCRIPTION OF THE DRAWINGS

FIGS. 3A to 3F are diagrams for describing of a mechanism of reducing the dew condensation in the intake ports during an engine stop;

DETAILED DESCRIPTION

Figure 1:
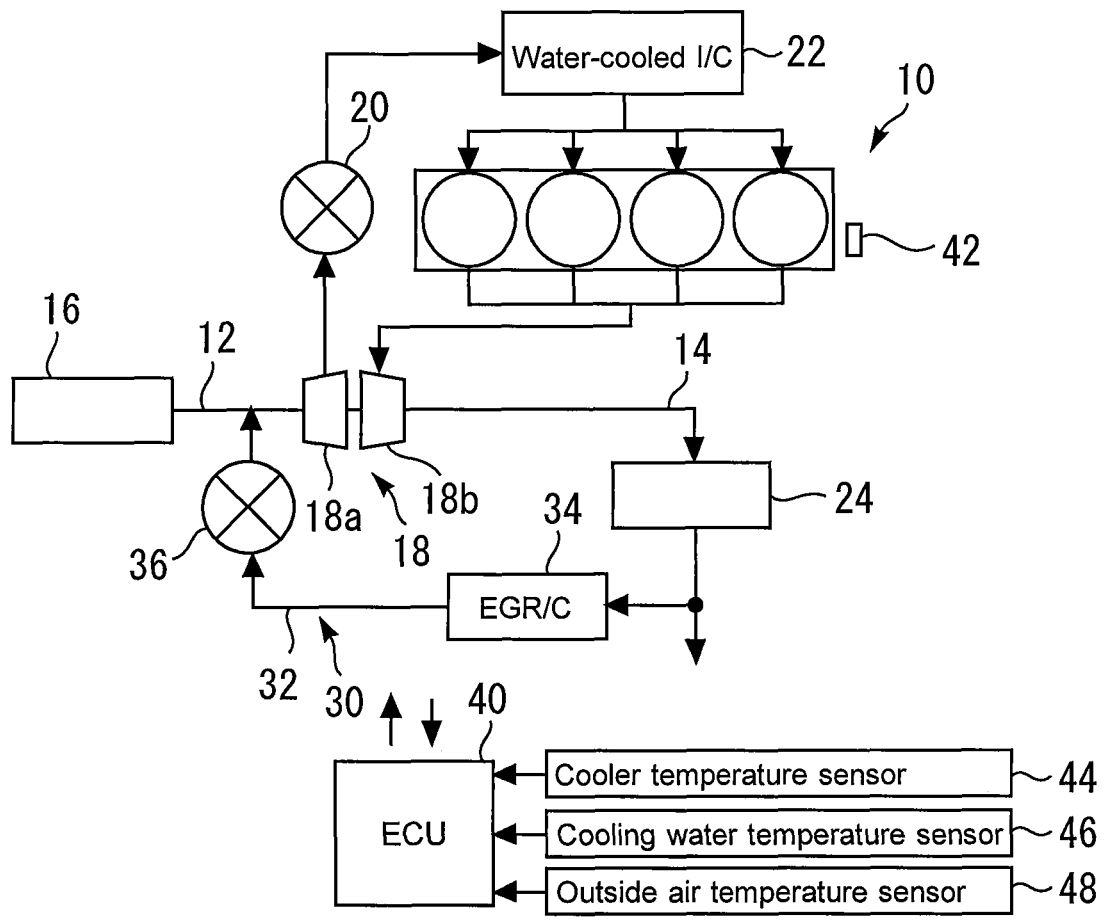
FIG. 1 is a diagram for describing a configuration of a system according to a first embodiment of the present disclosure.

In the following, embodiments of the present disclosure will be described with reference to the accompanying drawings. However, the same components in the drawings are denoted by the same reference numerals, and redundant descriptions thereof are omitted or simplified. Moreover, it is to be understood that even when the number, quantity, amount, range or other numerical attribute of an element is mentioned in the following description of the embodiments, the present disclosure is not limited to the mentioned numerical attribute unless explicitly described otherwise, or unless the present disclosure is explicitly specified by the numerical attribute theoretically. Further, structures or steps or the like that are described in conjunction with the following embodiments are not necessarily essential to the present disclosure unless explicitly shown otherwise, or unless the present disclosure is explicitly specified by the structures, steps or the like theoretically.

First Embodiment

Firstly, a first embodiment according to the present disclosure will be described with reference to FIGS. 1 to 6.

1-1. Example of Configuration of System

FIG. 1 is a diagram for describing the configuration of the system according to the first embodiment of the present disclosure. The system according to the present embodiment includes an internal combustion engine (as an example, a spark-ignition type gasoline engine) 10. An intake air passage 12 and an exhaust gas passage 14 communicate with each cylinder of the internal combustion engine 10.

An air cleaner 16 is provided in the vicinity of an inlet of the intake air passage 12. A compressor 18a of a turbo-supercharger 18 is provided downstream of the air cleaner 16. The compressor 18a is integrally coupled to a turbine 18b disposed in the exhaust gas passage 14 by a coupling shaft.

An electronically controlled throttle valve 20 is installed in a portion of the intake air passage 12 located on the downstream side of the compressor 18a. An intercooler 22, which cools the air compressed by the compressor 18a, is installed in a portion of the intake air passage 12 located on the downstream side of the throttle valve 20. The intercooler 22 is a water-cooled type and is a heat exchanger that provides heat exchange between intake air and cooling water. The configuration of an intake system around the intercooler 22 will be described with reference to FIG. 2. In addition, an exhaust gas purification catalyst (as an example, three-way catalyst) 24 is installed in a portion of the exhaust gas passage 14 located on the downstream side of the turbine 18b.

The internal combustion engine 10 shown in FIG. 1 includes a low pressure loop (LPL) type EGR device 30. The EGR device 30 is equipped with an EGR passage 32 adapted to connect a portion of the exhaust gas passage 14 located on the downstream side of the exhaust gas purification catalyst 24 and a portion of the intake air passage 12 located on the upstream side of the compressor 18a to each other. Viewed from the upstream side of the flow of the EGR gas fed back to the intake air passage 12 through the EGR passage 32, the EGR passage 32 is provided with an EGR cooler 34 and an EGR valve 36 in this order. The EGR cooler 34 is provided to cool the EGR gas that flows through the EGR passage 32. The EGR valve 36 is provided to adjust the amount of the EGR gas recirculated into the intake air passage 12 via the EGR passage 32.

As shown in FIG. 1, the system according to the present embodiment is further provided with an electronic control unit (ECU) 40. Various sensors installed in the internal combustion engine 10 and in the vehicle on which the internal combustion engine 10 is mounted and various actuators for controlling the operation of the internal combustion engine 10 are electrically connected to the ECU 40.

The various sensors described above include a crank angle sensor 42, a cooler temperature sensor 44, a cooling water temperature sensor 46 and an outside air temperature sensor 48. The crank angle sensor 42 outputs a signal responsive to the crank angle. The ECU 40 can obtain an engine speed Ne by the use of the crank angle sensor 42. The cooler temperature sensor 44 outputs a signal responsive to the temperature of the intercooler 22 (a cooler temperature Tc). In more detail, the cooler temperature Tc mentioned here is a wall surface temperature of an internal intake air passage 22b described later. The cooling water temperature sensor 46 outputs a signal responsive to the temperature (a cooling water temperature Tw) of the cooling water that flows into the intercooler 22. The outside air temperature sensor 48 outputs a signal responsive to an outside air temperature Te. Moreover, the various actuators described above include an electrically-driven water pump (W/P) 62 (see FIG. 2), and fuel injection valves and an ignition device that are not shown, as well as the throttle valve 20 and the EGR valve 36 described above.

The ECU 40 includes a processor, a memory, and an input/output interface. The input/output interface receives sensor signals from the various sensors described above, and also outputs actuating signals to the various actuators described above. In the memory, various control programs and maps for controlling the various actuators are stored. The processor reads out a control program from the memory and executes the control program. As a result, functions of the "control device for an internal combustion engine" according to the present embodiment are achieved.

1-1-1. Water-Cooled Intercooler

Figure 2:
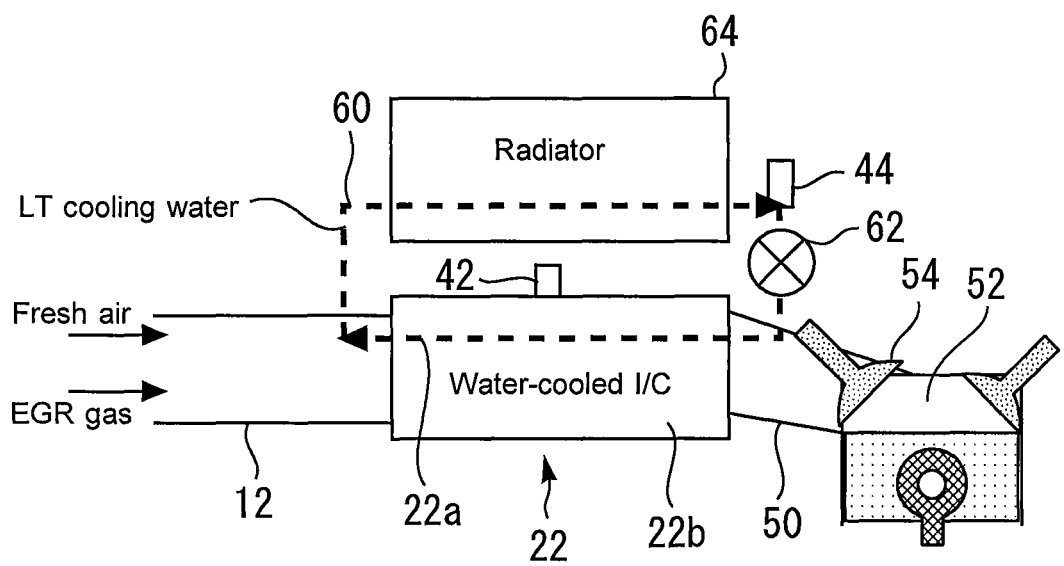
FIG. 2 is a diagram that schematically illustrates a configuration of an intake system around an intercooler and intake ports.

FIG. 2 is a diagram that schematically illustrates a configuration of the intake system around the intercooler 22 and intake ports 50. The intake ports 50 are formed in the cylinder head of the internal combustion engine 10. Inner passages of the intake ports 50 function as a part of the intake air passage 12. Intake valves 54 that open and close the intake ports 50 are respectively installed at end portions of the intake ports 50 located on the side of a combustion chamber 52. The intercooler 22 is arranged at a portion of the intake air passage 12 located on the upstream side of the intake ports 50.

The system shown in FIG. 1 includes a cooling water circulation loop 60 adapted to supply the cooling water with the intercooler 22 (which corresponds to an example of "water-cooled cooler" according to the present disclosure). The cooling water circulation loop 60 is equipped with an internal cooling water passage 22a that is formed inside the intercooler 22. Moreover, there is arranged on the cooling water circulation loop 60, a radiator 64 as well as the W/P 62 described above. The radiator 64 provides heat exchange between the cooling water and the outside air in order to release the heat that the cooling water has received from the intake air. Furthermore, the internal intake air passage 22b that functions as a part of the intake air passage 12 is formed inside the intercooler 22.

According to the configuration as described above, the W/P 62 is actuated to circulate the cooling water through the cooling water circulation loop 60, whereby the cooling water can be supplied to the intercooler 22. It should be noted that the cooling water circulation loop 60 is configured, as an example, separately from a cooling water circulation loop (not shown) for cooking the main body of the internal combustion engine 10. Thus, according to the cooling water circulation loop 60, a cooling water (hereunder, also referred to as an "LT (Low Temperature) cooling water") that lower in temperature than the cooling water that flows through this cooling water circulation loop can be supplied to the intercooler 22.

1-2. Cooling Water Control During Engine Stop According to First Embodiment

The control of the cooling water (LT cooling water) according to the present embodiment includes execution of a "water supply operation" for reducing the occurrence of the dew condensation of moisture in the intake ports 50 (in particular, around the intake valves 54) during an engine stop.

1-2-1. Mechanism of Reducing Dew Condensation in Intake Ports During Engine Stop by Water Supply Operation FIGS. 3A to 3F are diagrams for describing of a mechanism of reducing the dew condensation in the intake ports 50 during an engine stop.

As shown in FIG. 3A, condensed water is produced when the intake air suctioned into the combustion chamber 52 is cooled at the intercooler 22 during an engine operation. A part of the condensed water produced is taken into the combustion chamber 52 while being attached to the wall surfaces of the intake ports 50 due to a gas flow. In addition, the rest of the condensed water produced is mixed with the intake gas and suctioned into the combustion chamber 52 as a high humidity gas.

If, on the other hand, the operation of the internal combustion engine 10 is stopped, the gas flow is stopped, and the condensed water and the high humidity gas remain in the internal intake air passage 22b and the intake ports 50 as shown in FIG. 3B. The condensed water that has remained in the wall surface of the intake ports 50 once evaporates due to the residual heat of the internal combustion engine 10 immediately after the engine stop as shown in FIG. 3C.

There is a concern that, if no special consideration is made, the dew condensation of the moisture that has evaporated as described above may be produced in the intake ports 50 again when the wall surface temperature of the intake ports 50 (hereafter, also simply referred to an "intake port wall temperature") Tp has decreased during an engine stop (during an engine soak) thereafter.

According to the "water supply operation" that is executed during an engine stop in the present embodiment, in order to cool the wall surface of the internal intake air passage 22b, the W/P 62 is actuated to supply the cooing water with the intercooler 22.

FIGS. 3D and 3E represent the internal combustion engine 10 during an engine soak after the condensed water shown in FIG. 3C has evaporated. The intake port wall temperature Tp at a location closer to the combustion chamber 52 that is the heat source becomes higher than the cooler temperature Tc immediately after an engine stop. If there is a temperature difference ΔTpc (=Tp−Tc) between the intake ports 50 and the intercooler 22 in this way, a convection flow of the gas is produced in the intake air passage 12 located therebetween as shown in FIG. 3D.

The moisture in the gas that circulates in the intake air passage 12 between the intercooler 22 and the intake ports 50 by the effect of the convection flow described above becomes easier to be condensed at the wall surface that is lower in temperature. If the internal intake air passage 22b is cooled by the effect of the water supply operation according to the present embodiment, the temperature difference ΔTpc increases. Thus, the convection flow of the gas is facilitated, and the dew condensation of the moisture in the internal intake air passage 22b that is lower in temperature as compared to the intake ports 50 is also facilitated. Therefore, if the water supply operation is performed, the dew condensation in the side of the internal intake air passage 22b progresses with a lapse of the engine soak time as shown in FIG. 3E, and the gas that is convecting continues to evaporate.

FIG. 3F represents the internal combustion engine 10 in a status of an engine soak being completed (more specifically, in a status in which temperatures of the individual portions of the internal combustion engine 10 (representatively, the temperature of the cooling water that cools the main body of the internal combustion engine 10 and the temperature of oil that lubricates the main body) have converged to the outside air temperature Te). In this status, the intake port wall temperature Tp, the cooler temperature Tc and the cooling water temperature Tw have also converged to the outside air temperature Te. According to the water supply operation, as already described, the dew condensation of surplus moisture in the intake air passage 12 between the intercooler 22 and the intake ports 50 is facilitated on the side of the internal intake air passage 22b as a result of the convection flow of the gas being facilitated. Thus, as shown in FIG. 3F, even if the intake port wall temperature Tp decreases with the progress of the engine soak, the occurrence of the dew condensation in the intake ports 50 is reduced effectively.

1-2-2. Comparative Example (Example Without Water Supply Operation)

Figure 4:
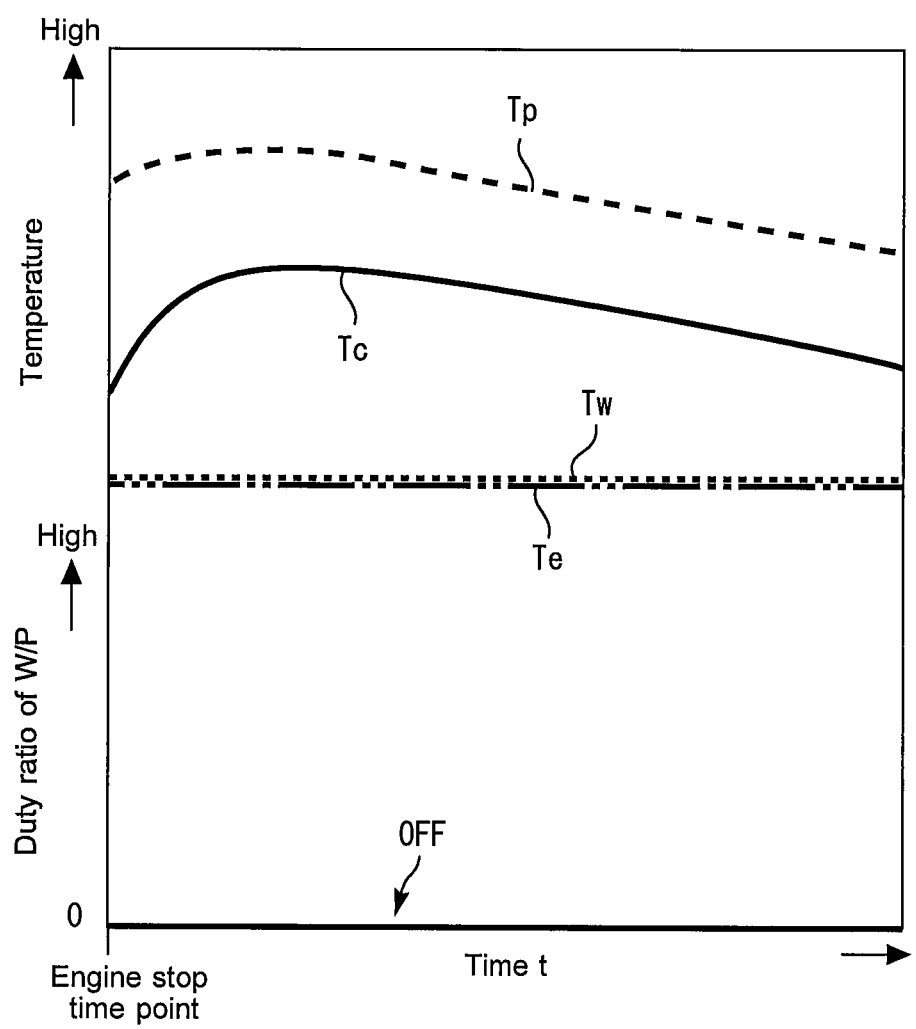
FIG. 4 is a time chart that illustrates an example of various temperature changes during an engine stop without a water supply operation.

FIG. 4 is a time chart that illustrates an example of various temperature changes during an engine stop without the water supply operation. The comparative example shown in FIG. 4 is referred to for comparison with the example according to the present embodiment in which the water supply operation is performed (see FIG. 5 described later). In more detail, FIG. 4 represents various temperature changes during a time period in which the engine soak is not completed (that is, a time period in which the intake port wall temperature Tp and the cooler temperature Tc are decreasing toward a convergence temperature equivalent to the outside air temperature Te). It should be noted that, even in any of time charts shown in FIG. 4 and other figures following FIG. 4 (such as FIG. 5), a situation in which an engine stop is done after an engine warm-up is completed is supposed in order to indicate typical examples of the various temperature changes during the engine stop.

As shown in FIG. 4, due to the effects of the heat received from the main body of the internal combustion engine 10 in which the circulation of the cooling water has stopped, the intake port wall temperature Tp once increases immediately after the engine stop and thereafter continues to decrease toward the outside air temperature Te. On the other hand, due to the effects of the residual heat of each of the residual gas in the intake air passage 12 and the cooling water, the cooler temperature Tc once increases immediately after the engine stop and thereafter continues to decrease toward the outside air temperature Te. The cooling water temperature Tw remains at values closer to the outside air temperature Te.

1-2-3. Example of Water Supply Operation According to First Embodiment

Figure 5:
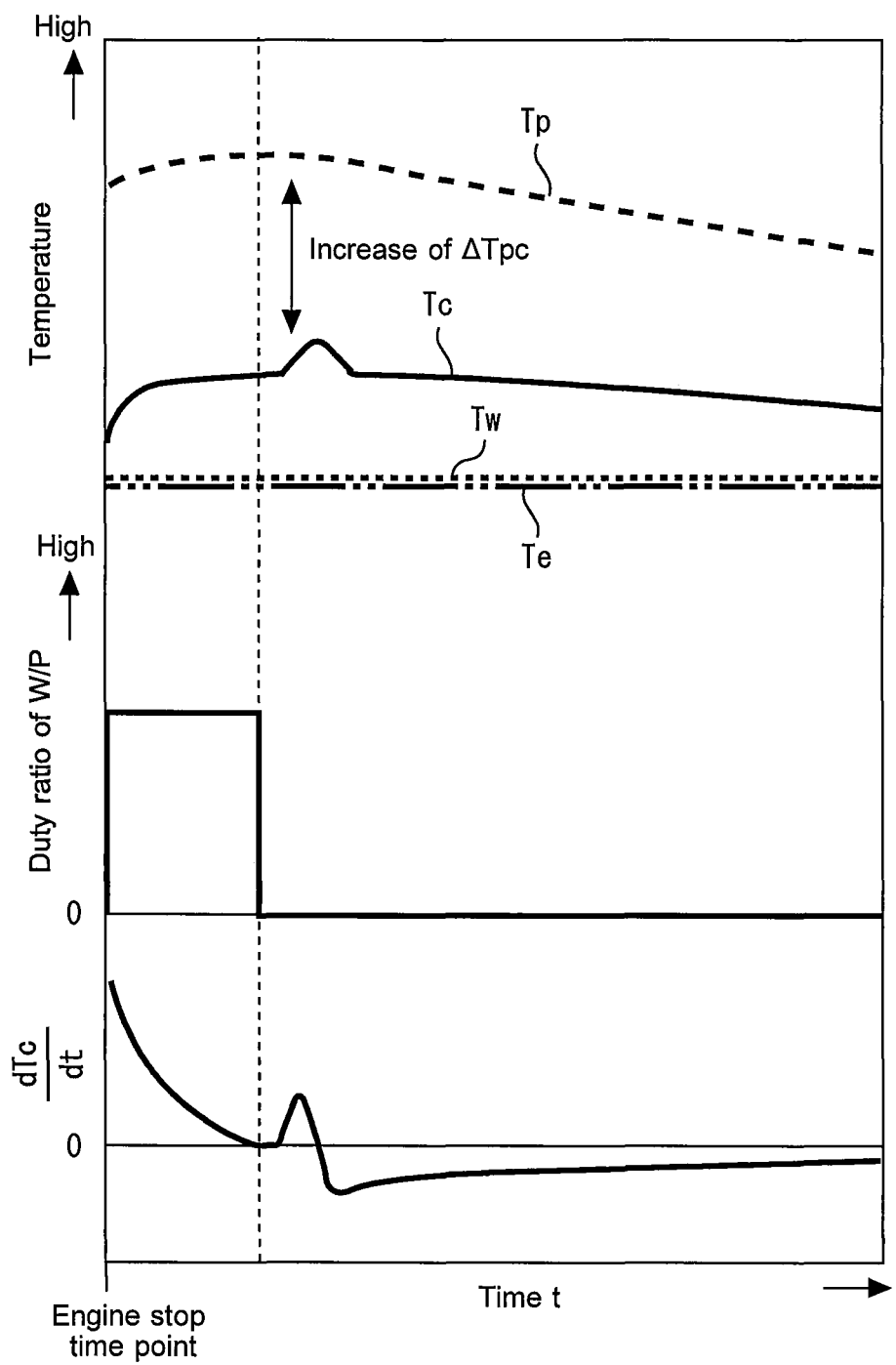
FIG. 5 is a time chart that illustrates the control of a W/P for the water supply operation according to the first embodiment of the present disclosure and an example of various temperature changes during an engine stop associated with this control.

FIG. 5 is a time chart that illustrates the control of the W/P 62 for the water supply operation according to the first embodiment of the present disclosure and an example of various temperature changes during an engine stop associated with this control.

An "execution condition (starting condition)" for the water supply operation according to the present embodiment includes a requirement that the cooler temperature Tc is higher than the cooling water temperature Tw and a requirement that a time change rate dTc/dt of the cooler temperature Tc is positive. In more detail, if the cooler temperature Tc is not higher than the cooling water temperature Tw, the cooler temperature Tc cannot be caused to decrease using the supply of the cooling water. Because of this, the requirement that the cooler temperature Tc is higher than the cooling water temperature Tw corresponds to a basic requirement for decreasing the cooler temperature Tc. Thus, if the cooler temperature Tc is equal to or lower than the cooling water temperature Tw during an engine stop, the water supply operation is not performed (not started).

On the other hand, the requirement that the time change rate dTc/dt is positive is used to determine a characteristic execution timing of the water supply operation according to the present embodiment. As already described with reference to FIG. 4, the cooler temperature Tc once increases immediately after an engine stop. Therefore, in the example shown in FIG. 5, the execution condition described above is promptly met immediately after the engine stop and the actuation of the W/P 62 (that is, the water supply operation) is started.

To be more specific, the flow rate control of the cooling water with the W/P 62 is, as an example, performed by the use of a duty control of a drive electric voltage thereof. Although the value of the Duty ratio is not particularly limited, in the example shown in FIG. 5, the maximum value (100%) is used to quickly decrease the cooler temperature Tc.

After the water supply operation starts, an increase of the cooler temperature Tc is reduced immediately after an engine stop as shown in FIG. 5, and the increase of the cooler temperature Tc eventually converges (that is, the time change rate dTc/dt becomes zero).

A requirement that the time change rate dTc/dt is zero corresponds to the main ending condition of the water supply operation according to the present embodiment. In the example shown in FIG. 5, the water supply operation ends as a result of this ending condition being met. After the water supply operation is stopped in this way, the cooler temperature Tc slightly increases as shown in FIG. 5 due to the effects of the residual heat of each of the residual gas in the intake air passage 12 and the cooling water, and thereafter continues to decrease toward the outside air temperature Te.

It should be noted that the water supply operation also ends when the cooler temperature Tc becomes equal to the cooling water temperature Tw during execution of the water supply operation, although the example shown in FIG. 5 does not represent that. The reason is related to the execution condition described above (Tc>Tw). That is, the reason why the water supply operation should be stopped in this manner is that, if the cooler temperature Tc is not higher than the cooling water temperature Tw, it is impossible to decrease the cooler temperature Tc. Also, one of examples in which the water supply operation ends in this kind of manner is that an engine stop is performed in a status in which the warm-up of the internal combustion engine 10 is not completed.

1-2-4. Advantageous Effects of Water Supply Operation According to First Embodiment According to the water supply operation of the present embodiment exemplified in FIG. 5, an increase of the cooler temperature Tc due to the residual heat of each of the residual gas in the intake air passage 12 and the cooling water can be reduced. As a result, it becomes possible to increase the temperature difference $\Delta Tpc$ (=Tp−Tc) during an engine stop (i.e., during an engine soak). Therefore, an environment in which the dew condensation of the moisture is easier to be produced on the side of the internal intake air passage 22b than on the side of the intake ports 50 is achieved. Also, the convection flow of the gas in the intake air passage 12 between the intercooler 22 and the intake ports 50 can be facilitated.

Moreover, the water supply operation according to the present embodiment starts when the time change rate dTc/dt is positive immediately after an engine stop (that is, when the cooler temperature Tc is increasing), and stops when the time change rate dTc/dt becomes zero. As a result, as can be seen by comparing FIG. 4 with FIG. 5, a peak value of the cooler temperature Tc can be lowered when the cooler temperature Tc increases due to the residual heat described above. Furthermore, in contrast to the present embodiment, even in a time period after a time point at which the time change rate dTc/dt becomes zero, the water supply operation may alternatively be continuously performed since the basic execution condition (Tc>Tw) described above is met. However, if the water supply operation is performed in such a manner as to lower the peak value as in the example shown in FIG. 5, the temperature difference $\Delta Tpc$ can be effectively increased during the engine stop while keeping short the execution time (that is, the actuation time of the W/P 62).

Figure 6:
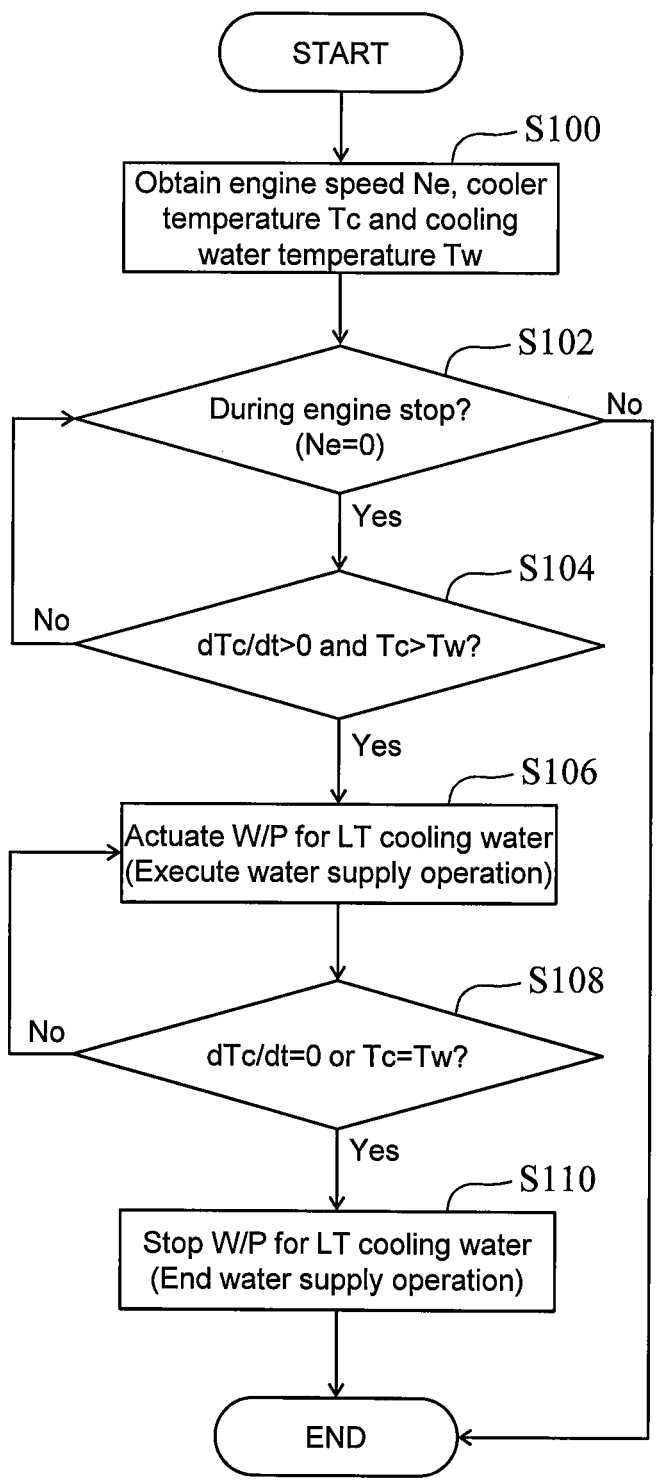
FIG. 6 is a flow chart that illustrates a routine of the processing concerning the water supply operation according to the first embodiment of the present disclosure.

1-2-5. Processing of ECU Concerning Water Supply Operation According to First Embodiment FIG. 6 is a flow chart that illustrates a routine of the processing concerning the water supply operation according to the first embodiment of the present disclosure. It should be noted that the present routine starts up during an engine operation and also during an engine stop.

According to the routine shown in FIG. 6, firstly, the ECU 40 obtains the engine speed Ne, the cooler temperature Tc and the cooling water temperature Tw by the use of the crank angle sensor 42, the cooler temperature sensor 44 and the cooling water temperature sensor 46, respectively (step S100). It should be noted that the cooler temperature Tc and the cooling water temperature Tw may alternatively be obtained by the use of, for example, an estimation manner described below, instead of the use of the sensors 44 and 46. More specifically, the cooler temperature Tc may alternatively be estimated on the basis of the outlet temperature of the radiator 64 (i.e., cooling water temperature Tw), a cooling efficiency of the intercooler 22, a cooling water flow rate, the outside air temperature Te and an intake gas temperature. The cooling water temperature Tw may alternatively be estimated on the basis of the cooling water flow rate, a cooling efficiency of the radiator 64 and the outside air temperature Te.

Next, the ECU 40 determines whether or not the internal combustion engine 10 is in a stopped state, on the basis of whether or not the engine speed Ne is zero (step S102). The operation of the internal combustion engine 10 (i.e., the rotation of the crankshaft) is caused to stop when an ignition switch is turned OFF by the driver. In addition, in an example of a hybrid vehicle that uses an internal combustion engine and an electric motor as its power source, the operation of the internal combustion engine may be caused to stop in order to perform a running by the use of only the electric motor during a start-up of the vehicle system.

If the ECU 40 determines in step S102 that the internal combustion engine 10 is not in a stopped state, it promptly ends the processing of the present routine. If, on the other hand, the ECU 40 determines that the internal combustion engine 10 is in a stopped state, it proceeds to step S104.

In step S104, the ECU 40 determines whether or not the execution condition (starting condition) of the water supply operation is met (that is, whether or not the time change rate dTc/dt of the cooler temperature Tc is positive and the cooler temperature Tc is higher than the cooling water temperature Tw). As a result, if this execution condition is not met, the ECU 40 repeatedly executes the processing of step S102.

If, on the other hand, the execution condition of the water supply operation is met, the ECU 40 actuates the W/P 62 of the LT cooling water in accordance with a predetermined Duty ratio (for example, 100%) (step S106). As a result of this, the water supply operation starts.

Next, the ECU 40 determines whether or not the ending condition of the water supply operation is met (that is, whether or not the time change rate dTc/dt is zero, or whether or not the cooler temperature Tc is equal to the cooling water temperature Tw) (step S108). As a result, if this ending condition is not met, the ECU 40 returns to step S106 to continuously execute the water supply operation.

It should be noted that, in step S108, whether or not the time change rate dTc/dt is substantially zero (for example, whether or not the time change rate dTc/dt falls within a predetermined range that includes zero and is located in the vicinity of zero) may alternatively be determined, instead of the determination as to whether or not the time change rate dTc/dt is zero. Similarly, whether or not the cooler temperature Tc is substantially equal to the cooling water temperature Tw (for example, whether or not the absolute value of a difference between the cooler temperature Tc and the cooling water temperature Tw is not greater than a determined value) may alternatively be determined, instead of the determination as to whether or not the cooler temperature Tc is equal to the cooling water temperature Tw. These also apply to the processing of steps S304 and S400 described later.

If, on the other hand, the ending condition of the water supply operation is met, the ECU 40 stops the actuation of the W/P 62 (step S110). As a result, the water supply operation ends. It should be noted that the present routine is not supposed to be started-up again during the next engine stop after the processing proceeds to step S110 after the engine stop (that is, after the water supply operation is once performed immediately after an engine start-up). In other words, when the ECU 40 proceeds to step S110, the water supply operation for the current engine stop completes.

Second Embodiment

Next, a second embodiment according to the present disclosure will be described with reference to FIGS. 7 and 8. It should be noted that, in the following description, the configuration shown in FIG. 1 is supposed to be used as an example of the configuration of a system according to the second embodiment. This also applies to third to fifth embodiments described later.

2-1. Outline of Water Supply Operation According to Second Embodiment

Although the water supply operation according to the present embodiment is the same as the water supply operation according to the first embodiment in terms of the peak value of the cooler temperature Tc being lowered immediately after an engine stop, it is different from the water supply operation according to the first embodiment in the following point.

Figure 7:
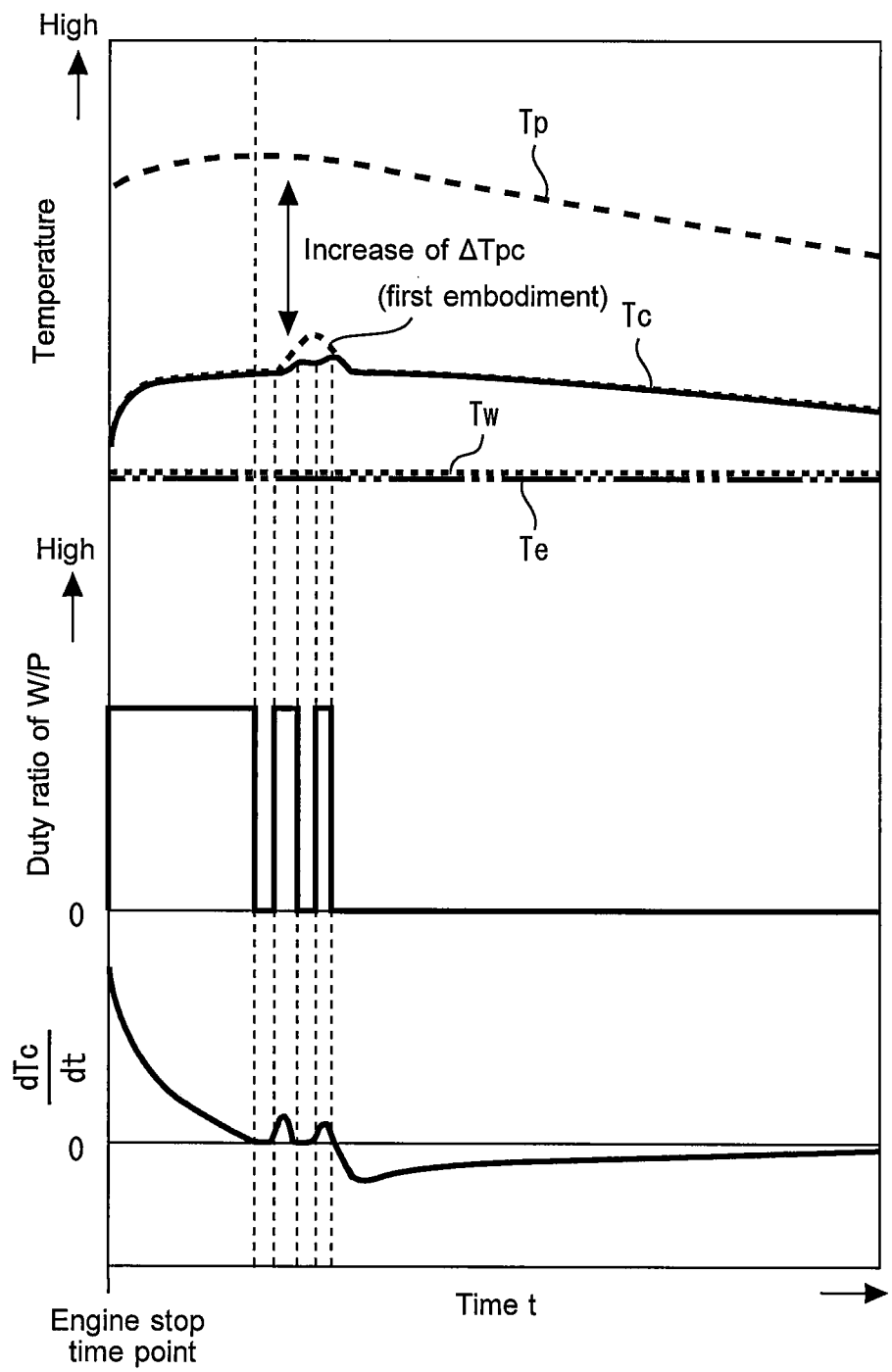
FIG. 7 is a time chart that illustrates the control of the W/P for a water supply operation according to a second embodiment of the present disclosure and an example of various temperature changes during an engine stop associated with this control.

FIG. 7 is a time chart that illustrates the control of the W/P 62 for the water supply operation according to the second embodiment of the present disclosure and an example of various temperature changes during an engine stop associated with this control. The water supply operation according to the first embodiment ends when the time change rate dTc/dt once becomes zero and does not re-start during engine stops thereafter.

On the other hand, the water supply operation according to the present embodiment re-starts when the time change rate dTc/dt becomes positive again due to the residual heat of each of the residual gas in the intake air passage 12 and the cooling gas after ending when the time change rate dTc/dt becomes zero first. In the example shown in FIG. 7, the water supply operation is intermittently performed twice after ending when the time change rate dTc/dt becomes zero. It should be noted that, in this example, the effect of the residual heat described above is eliminated after the two-time re-execution, and, as a result, even if the water supply operation is not accompanied, the cooler temperature Tc naturally decreases toward the outside air temperature Te.

2-2. Advantageous Effects of Water Supply Operation According to Second Embodiment According to the water supply operation of the present embodiment described so far, the water supply operation that uses, as its ending condition, the requirement that the time change rate dTc/dt is zero is repeatedly executed until the time change rate dTc/dt of the cooler temperature Tc shifts to a negative value after an engine stop. Thus, as can be seen by comparing FIG. 5 with FIG. 7, an increase of the cooler temperature Tc due to the residual heat described above can be lowered after the execution of the initial water supply operation, as compared to the water supply operation according to the first embodiment. This is more favorable for an increase of the temperature difference ΔTpc (=Tp−Tc).

2-3. Processing of ECU Concerning Water Supply Operation According to Second Embodiment FIG. 8 is a flow chart that illustrates a routine of the processing concerning the water supply operation according to the second embodiment of the present disclosure. The processing of steps S100 to S110 of the routine shown in FIG. 8 is as already described for the first embodiment.

Figure 8:
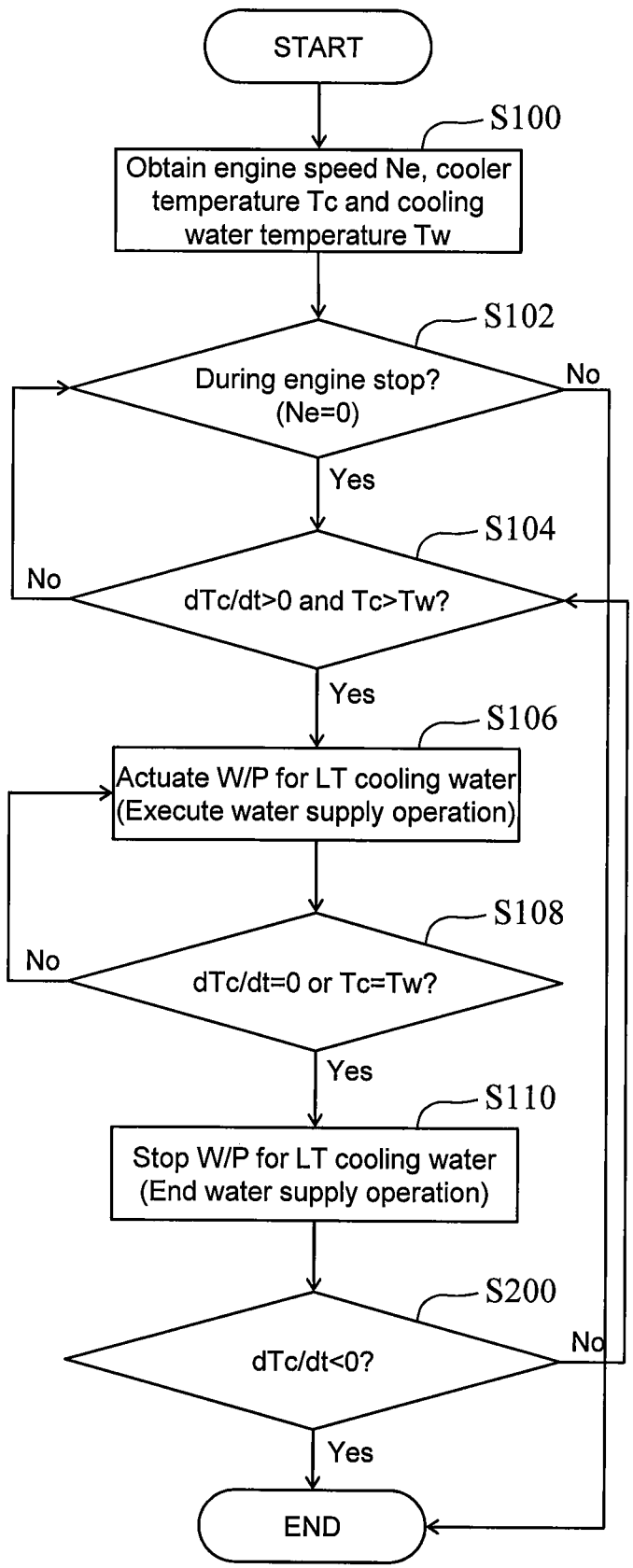
FIG. 8 is a flow chart that illustrates a routine of the processing concerning the water supply operation according to the second embodiment of the present disclosure.

According to the routine shown in FIG. 8, when the ECU 40 ends the water supply operation (step S110) as a result of the ending condition of the water supply operation being met in step S108, it proceeds to step S200. In step S200, the ECU 40 determines whether or not the time change rate dTc/dt is a negative value.

If the result of the determination of step S200 is negative, that is, while the time change rate dTc/dt does not shift to a negative value due to the effect of the residual heat described above, the ECU 40 repeatedly executes the processing of step S104.

If, on the other hand, the result of the determination of step S200 is positive, that is, if the time change rate dTc/dt shifts to a negative value as a result of the effect of the residual heat being eliminated, the ECU 40 promptly ends the processing of the present routine. It should be noted that the present routine is not supposed to be started up again during an engine stop after the result of the determination of step S200 once becomes positive. In other words, the water supply operation during the current engine stop is completed when the result of the determination of step S200 becomes positive.

Third Embodiment

Next, a third embodiment according to the present disclosure will be described with reference to FIGS. 9 to 13.
3-1. Outline of Water Supply Operation According to Third Embodiment The outside air temperature Te may change after an engine soak is once completed after an engine stop. In contrast to the water supply operation according to the first embodiment, the water supply operation according to the present embodiment is executed not only immediately after an engine stop but also when the outside air temperature Te changes after the engine soak is once completed.

Furthermore, the water supply operation according to the present embodiment is also different from the water supply operation according to the first embodiment in terms of the way of execution immediately after an engine stop. That is, immediately after an engine stop, the water supply operation according to the present embodiment is continuously executed until the cooler temperature Tc converges to the outside air temperature Te, instead of a short-time execution for lowering the peak value of the cooler temperature Tc.

3-2. Comparative Examples (Examples in Which Outside Air Temperature Te Changes Without Water Supply Operation)

Figure 9:
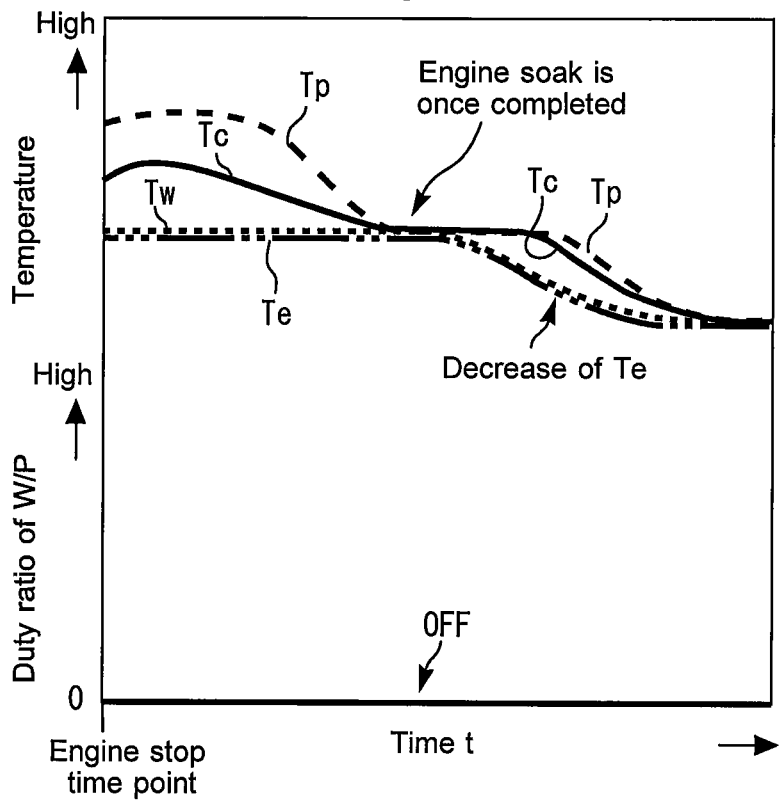
FIG. 9 is a time chart that illustrates a comparative example concerning when an outside air temperature Te decreases after an engine soak is once completed.

FIG. 9 is a time chart that illustrates a comparative example concerning when the outside air temperature Te decreases after an engine soak is once completed. After an engine stop, the outside air temperature Te may decrease after an engine soak is once completed as shown in FIG. 9. However, the ways of decrease of the intake port wall temperature Tp, the cooler temperature Tc and the cooling water temperature Tw in response to a decrease of the outside air temperature Te are not the same as each other.

More specifically, as shown in FIG. 9, there is a delay in decrease of the intake port wall temperature Tp and the cooler temperature Tc in response to a decrease of the outside air temperature Te. As a result, when the outside air temperature Te decreases, a gap arises between the intake port wall temperature Tp and the cooler temperature Tc, and the cooling water temperature Tw. Thus, by lowering the cooler temperature Tc by means of the execution of the water supply operation, the temperature difference ΔTpc (=Tp−Te) can be increased.

Figure 10:
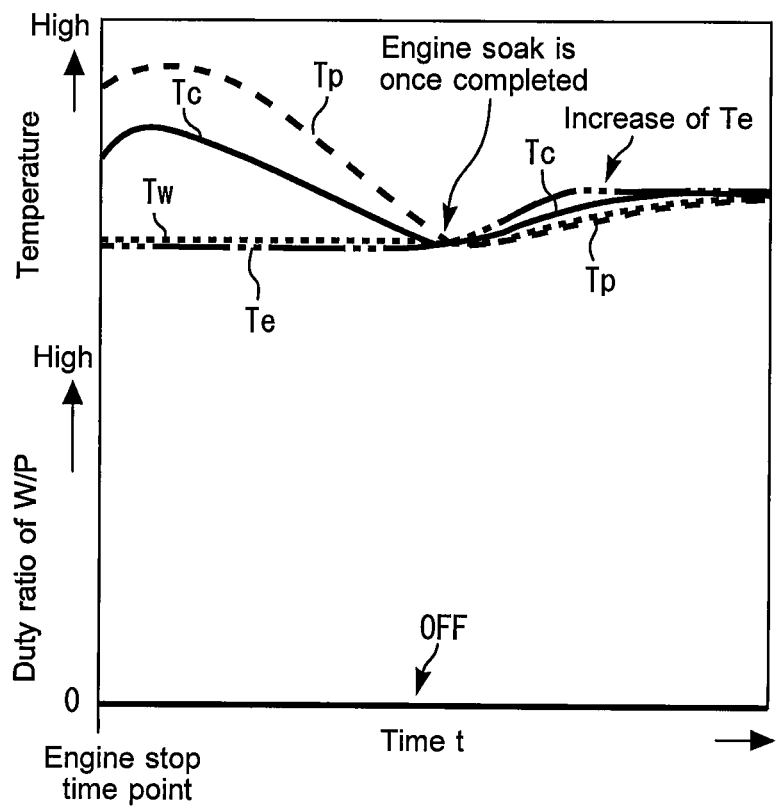
FIG. 10 is a time chart that illustrates another comparative example concerning when the outside air temperature Te increases after an engine soak is once completed.

FIG. 10 is a time chart that illustrates another comparative example concerning when the outside air temperature Te increases after an engine soak is once completed. After an engine stop, as shown in FIG. 10, the outside air temperature Te may also increase after an engine soak is once completed. However, the ways of increase of the intake port wall temperature Tp, the cooler temperature Tc and the cooling water temperature Tw in response to an increase of the outside air temperature Te are not also the same as each other.

More specifically, as shown in FIG. 10, when the outside air temperature Te increases, the cooler temperature Tc is easier to warm as compared to the intake port wall temperature Tp due to a difference in heat capacity. As a result, the cooler temperature Tc temporally becomes higher than the intake port wall temperature Tp. A status in which the cooler temperature Tc is higher than the intake port wall temperature Tp is not favorable for the reduction of occurrence of the dew condensation in the intake ports 50.

3-3. Example of Water Supply Operation According to Third Embodiment

When the outside air temperature Te decreases after an engine soak is once completed, if the cooler temperature Tc is lowered by means of the execution of the water supply operation as described above, the temperature difference ΔTpc can be increased. On the other hand, when the outside air temperature Te increases, if the cooler temperature Tc is lowered by means of the execution of the water supply operation, a temperature difference ΔTcp (=Tc−Tp) that is opposite in sign to the temperature difference ΔTpc described above can be decreased. This also leads to enable the dew condensation of the moisture to be prevented from becoming easier to be produced on the side of the intake ports 50 as compared to the side of the internal intake air passage 22b.

Accordingly, in the present embodiment, the following "execution condition (starting condition)" and "ending condition" are used in order to enable the water supply operation to be performed not only immediately after an engine stop but also when the outside air temperature Te decreases or increases after an engine soak is once completed.

In detail, the "execution condition" according to the present embodiment includes a requirement that there is a time change of the cooler temperature Tc (dTc/dt≠0) as well as the requirement that the cooler temperature Tc is higher than the cooling water temperature Tw. On the other hand, the "ending condition includes a requirement that the cooler temperature Tc is equal to the outside air temperature Te as well as the requirement that the time change rate dTc/dt is zero.

Figure 11:
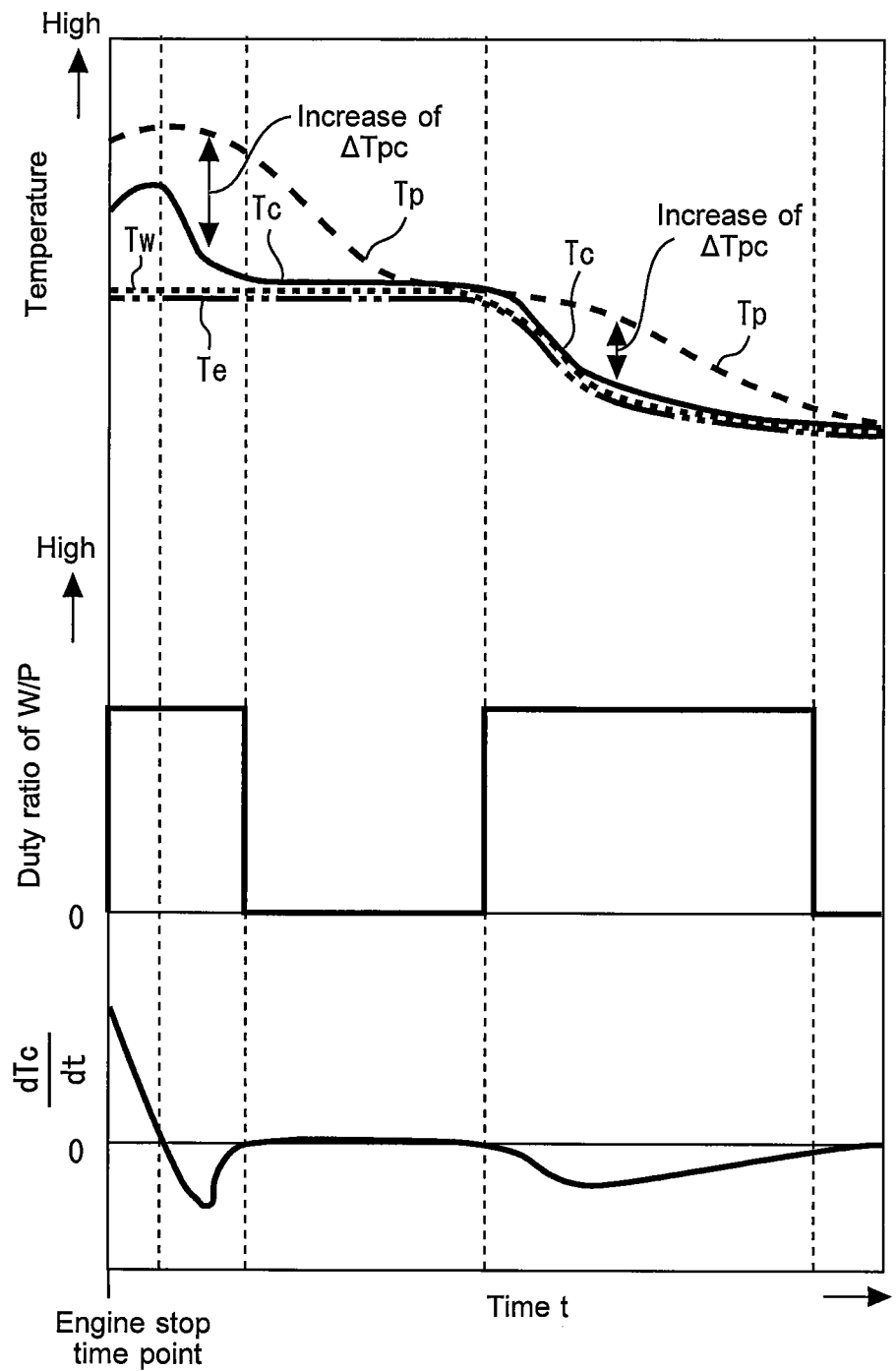
FIG. 11 is a time chart that illustrates the control of the W/P for a water supply operation according to a third embodiment of the present disclosure and an example of various temperature changes during an engine stop associated with this control.
Figure 12:
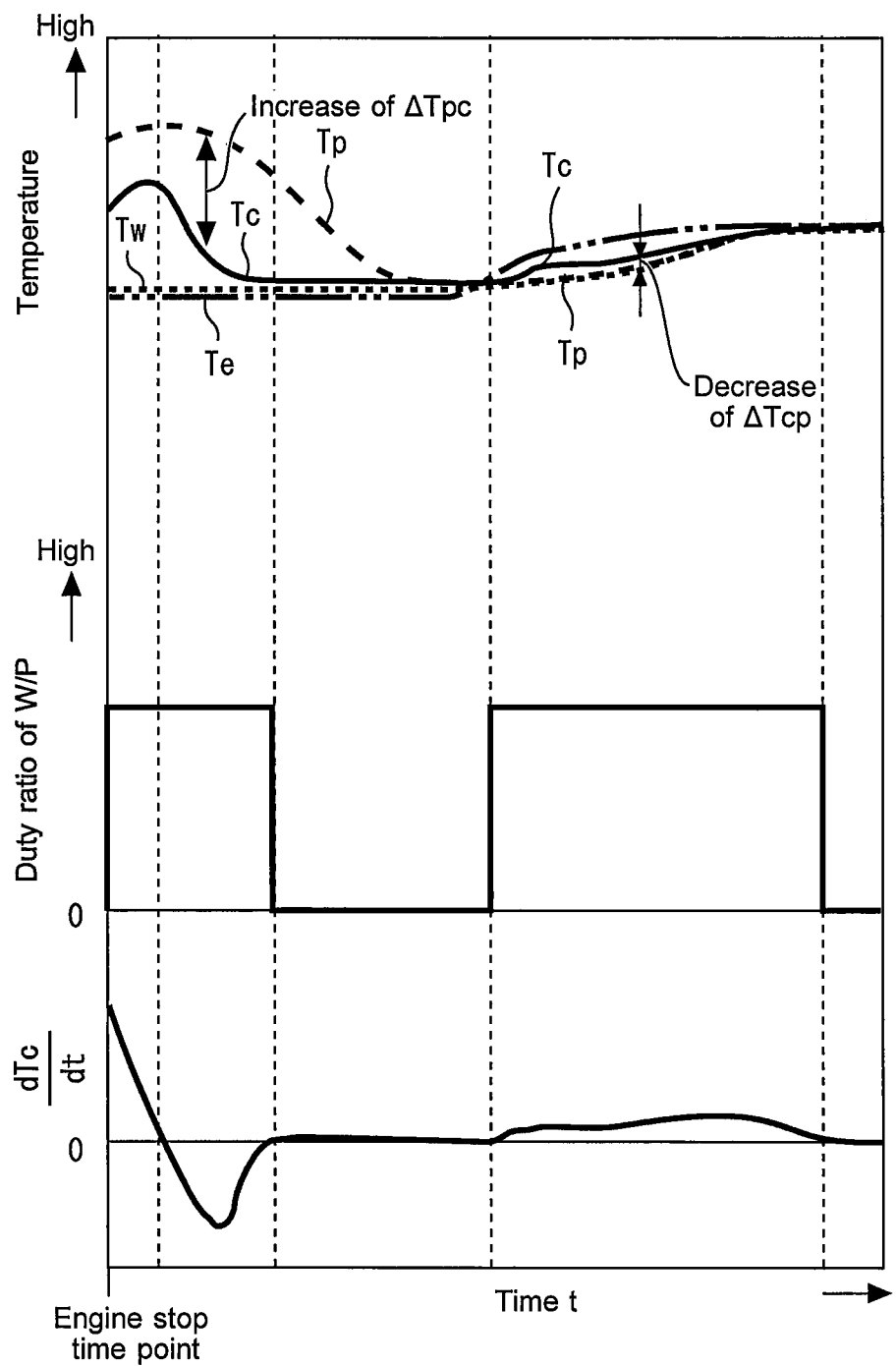
FIG. 12 is a time chart that illustrates the control of the W/P for a water supply operation according to the third embodiment of the present disclosure and an example of various temperature changes during an engine stop associated with this control.

FIGS. 11 and 12 are time charts that illustrate the control of the W/P 62 for the water supply operation according to the third embodiment of the present disclosure and examples of various temperature changes during an engine stop associated with this control. In more detail, FIG. 11 represents a time chart of the example in which a decrease of the outside air temperature Te is seen, and FIG. 12 represents a time chart of the example in which an increase of the outside air temperature Te is seen.

Firstly, the example shown in FIG. 11 will be described. According to the execution condition described above, the water supply operation is started immediately after an engine stop as shown in FIG. 11. The ending condition described above includes the requirement that the cooler temperature Tc is equal to the outside air temperature Te. Thus, even if the cooler temperature Tc reaches its peak value after the water supply operation starts (that is, even if the time change rate dTc/dt becomes zero), the water supply operation does not end since the cooler temperature Tc is higher than the outside air temperature Te. The initial water supply operation ends, in accordance with the ending condition described above, when the cooler temperature Tc becomes unchanged thereafter and the cooler temperature Tc converges to the outside air temperature Te.

Furthermore, in the example shown in FIG. 11, when the outside air temperature Te decreases after an engine soak is once completed, the water supply operation is re-started since the execution condition described above is also met. As a result, as can be seen by comparing FIG. 9 with FIG. 11, the cooler temperature Tc can be decreased up to equivalent of the cooling water temperature Tw, and the temperature difference ΔTpc can thus be decreased. In addition, this second water supply operation ends when the ending condition described above is met thereafter.

Next, the example shown in FIG. 12 will be described. The start and end of the initial water supply operation performed immediately after an engine stop is the same as that in the example shown in FIG. 11. In the example shown in FIG. 12, when the outside air temperature Te increases after an engine soak is once completed, the water supply operation is re-started since the execution condition described above is also met. As a result, as can be seen by comparing FIG. 10 with FIG. 12, the cooler temperature Tc can be decreased up to equivalent of the cooling water temperature Tw, and the temperature difference ΔTcp (=Tc−Tp) can thus be decreased. In addition, this second water supply operation ends when the ending condition described above is met thereafter.

3-4. Advantageous Effects of Water Supply Operation According to Third Embodiment The water supply operation according to the present embodiment exemplified by FIGS. 11 and 12 is executed until a change of the cooler temperature Tc becomes unchanged and the cooler temperature Tc converges to the outside air temperature Te. Although the working time of the W/P 62 at the same engine stopping condition becomes longer than that for the water supply operation according to the first embodiment by which the peak value of the cooler temperature Tc is lowered, the temperature difference ΔTpc can be increased more sufficiently.

Moreover, according to the water supply operation of the present embodiment, when the outside air temperature Te decreases after an engine soak is once completed, an environment in which the dew condensation is easier to be produced on the side of the internal intake air passage 22b as compared to the side of the intake ports 50 is also achieved owing to an increase of the temperature difference ΔTpc. Furthermore, when the outside air temperature Te increases after an engine soak is once completed, it becomes possible to prevent the dew condensation of the moisture from being easier to be produced on the side of the intake ports 50 as compared to the side of the internal intake air passage 22b due to a decrease of the temperature difference ΔTcp that is opposite in sign to the temperature difference ΔTpc described above.

Figure 13:
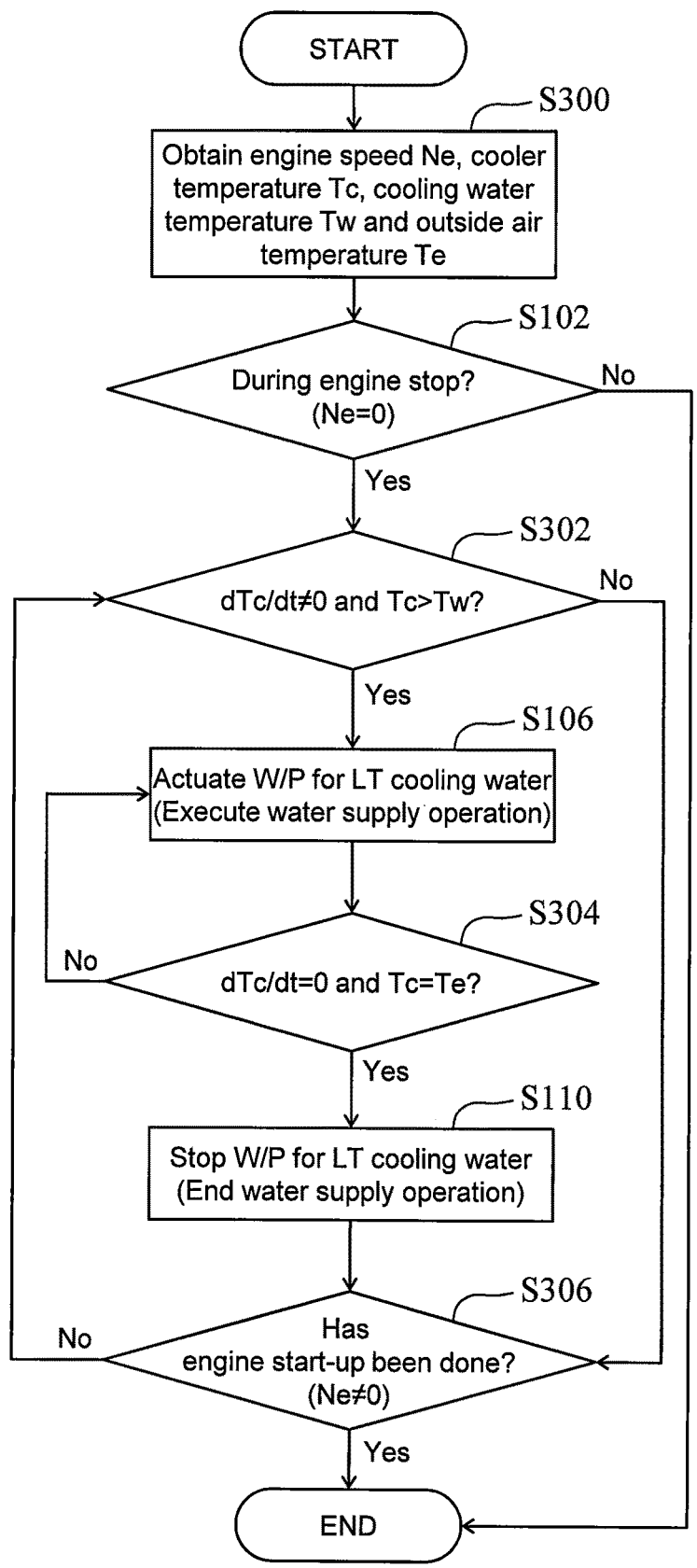
FIG. 13 is a flow chart that illustrates a routine of the processing concerning the water supply operation according to the third embodiment of the present disclosure.

3-5. Processing of ECU Concerning Water Supply Operation According to Third Embodiment FIG. 13 is a flow chart that illustrates a routine of the processing concerning the water supply operation according to the third embodiment of the present disclosure. The processing of steps S102, S106 and S110 in the routine shown in FIG. 13 is as already described for the first embodiment.

According to the routine shown in FIG. 13, firstly, the ECU 40 obtains not only the engine speed Ne, the cooler temperature Tc and the cooling water temperature Tw (the same as the processing of step S100) but also the outside air temperature Te by the use of the outside air temperature sensor 48 (step S300).

Moreover, the ECU 40 determines in step S102 that the internal combustion engine 10 is in a stopped state, it proceeds to step S302. In step S302, the ECU 40 determines whether or not the execution condition of the water supply operation is met. In detail, it is determined whether or not there is a time change of the cooler temperature Tc (dTc/dt≠0) and the cooler temperature Tc is higher than the cooling water temperature Tw. It should be noted that the determination as to whether or not there is a time change of the cooler temperature Tc may alternatively be made on the basis of whether or not the the time change rate dTc/dt is substantially zero (for example, whether or not the time change rate dTc/dt falls within a predetermined range that includes zero and is located in the vicinity of zero), instead of whether or not the time change rate dTc/dt is zero.

When the ECU 40 determines in step S302 that the execution condition is met, it actuates the W/P 62 of the LT cooling water (i.e., starts the water supply operation) in step S106. Then, the ECU 40 determines whether or not the ending condition of the water supply operation is met (step S304). In detail, it is determined whether or not the time change rate dTc/dt is zero and the cooler temperature Tc is equal to the outside air temperature Te.

It should be noted that, in step S304, whether or not the cooler temperature Tc is substantially equal to the outside air temperature Te (for example, whether or not the absolute value of a difference between the cooler temperature Tc and the outside air temperature Te is equal to or less than a predetermined value) may alternatively be determined instead of the determination as to whether or not the cooler temperature Tc is equal to the outside air temperature Te. In addition, the outside air temperature Te used for the ending condition of step S304 may alternatively be substituted by the cooling water temperature Tw. That is, this ending condition may alternatively include a requirement that the cooler temperature Tc is equal to or substantially equal to the cooling water temperature Tw as well as the requirement that the time change rate dTc/dt is zero.

While the ending condition is not met in step S304, the ECU 40 returns to step S106 and continuously executes the water supply operation. If, on the other hand, the ending condition is met, the ECU 40 stops the actuation of the W/P 62 (i.e., ends the water supply operation) in step S110.

Next, the ECU 40 determines whether or not an engine start-up (re-start) has been done (step S306). Whether or not an engine start-up has been done can be determined on the basis of, for example, whether the engine speed Ne is not zero.

While it is determined in step S306 that an engine start-up has not yet been done, the ECU 40 proceeds to step S302 to determine whether or not the execution condition of the water supply operation is met. As a result, if the execution condition has been met again (that is, when the outside air temperature Te starts to decrease or to increase), the ECU 40 proceeds to step S106 and the water supply operation is re-started. If, on the other hand, the execution condition is not met, the ECU 40 returns to step S306. Thus, while the execution condition is not met after the processing of step S110 and no engine start-up is performed, the water supply operation remains stopped.

Furthermore, the ECU 40 determines in step S306 that an engine start-up has been done, it promptly ends the processing of the present routine. It should be noted that, according to the processing of the present routine, the water supply operation is re-started as long as the execution condition is met again during an engine stop. Because of this, it can be said that the time to confirm the completion of the water supply operation in the example of the present routine is when the next engine start-up is performed.

Fourth Embodiment

Next, a fourth embodiment according to the present disclosure will be described with reference to FIGS. 14 to 16.

4-1. Outline of Water Supply Operation According to Fourth Embodiment

The water supply operation according to the present embodiment is different from the water supply operation according to the third embodiment in terms of the ending conditions of the water supply operations are different from each other. In detail, either a requirement that the time change rate dTc/dt is lower than or equal to a negative threshold value TH or a requirement that the cooler temperature Tc is equal to the cooling water temperature Tw corresponds to the "ending condition" according to the present embodiment.

The water supply operation according to the present embodiment is different from the water supply operation according to the third embodiment in terms of the way of the actuation of the W/P 62, due to a difference of the respective ending conditions described above. The following description will focus on this difference while referring to operation examples shown in FIGS. 14 and 15 concerning the water supply operation according to the present embodiment.

Figure 14:
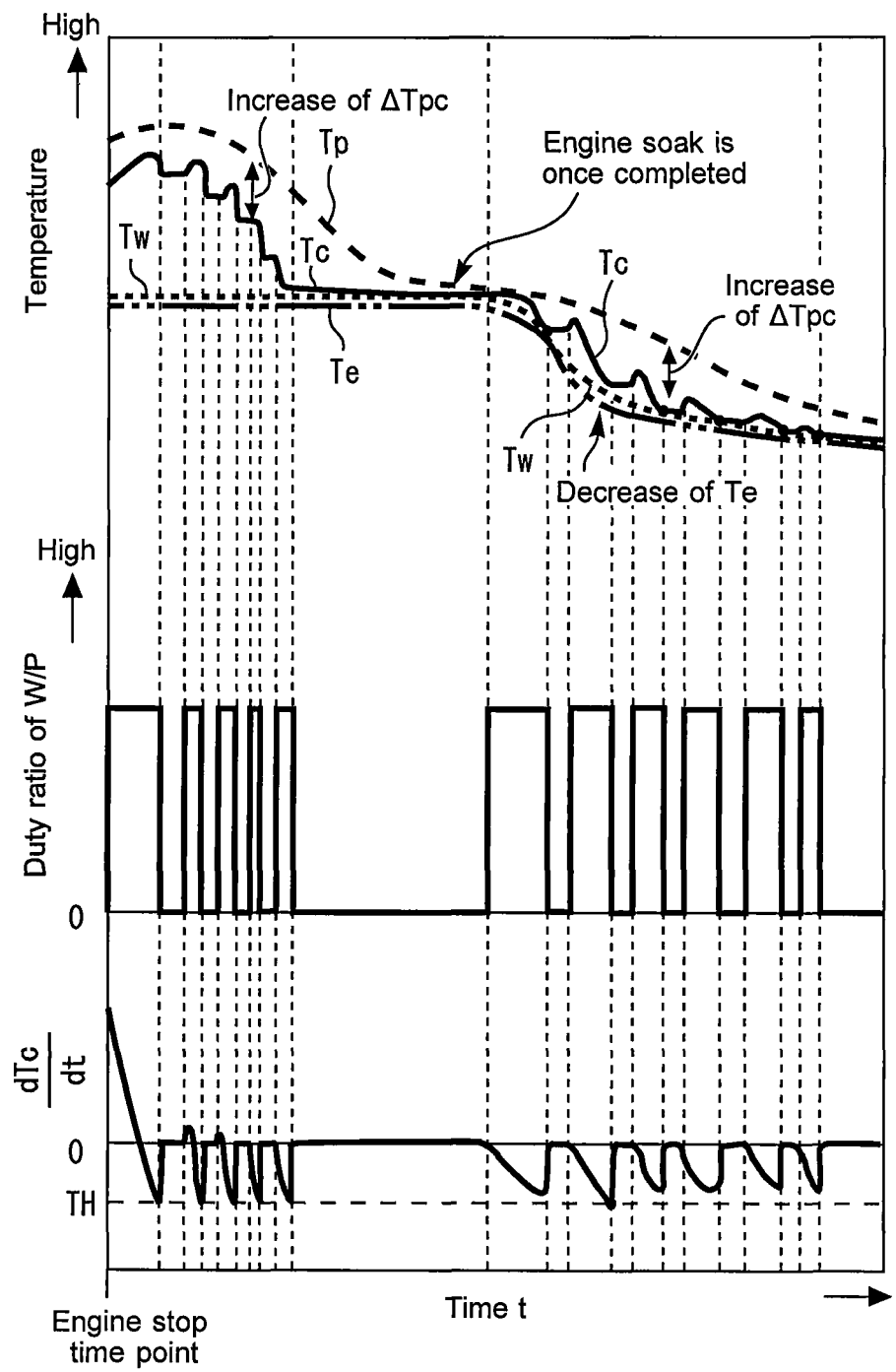
FIG. 14 is a time charts that illustrates the control of the W/P for a water supply operation according to a fourth embodiment of the present disclosure and an example of various temperature changes during an engine stop associated with this control.
Figure 15:
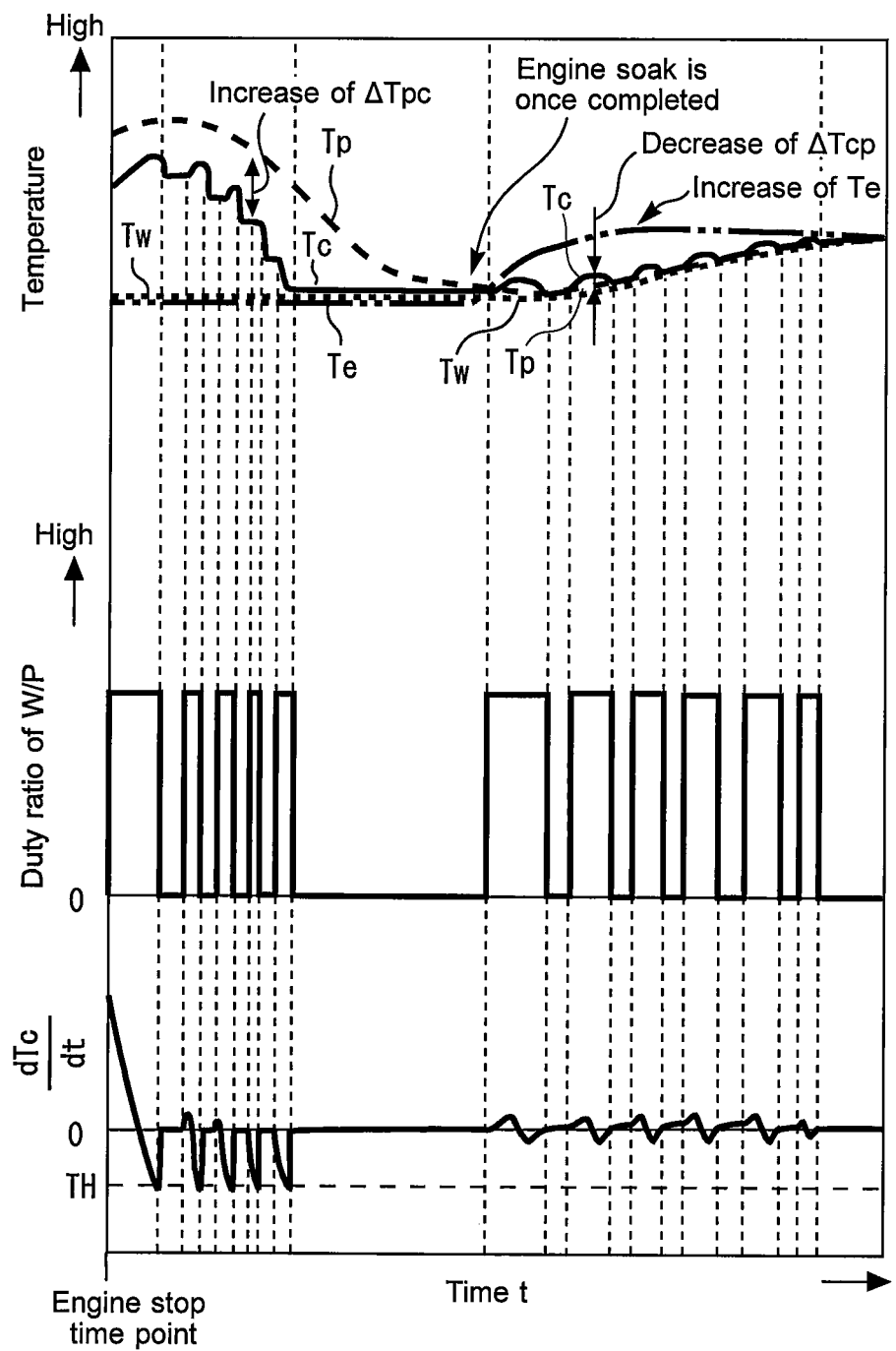
FIG. 15 is a time charts that illustrates the control of the W/P for a water supply operation according to the fourth embodiment of the present disclosure and an example of various temperature changes during an engine stop associated with this control.

FIGS. 14 and 15 are time charts that illustrate the control of the W/P 62 for the water supply operation according to the fourth embodiment of the present disclosure and examples of various temperature changes during an engine stop associated with this control. In more detail, FIG. 14 represents a time chart of the example in which a decrease of the outside air temperature Te is seen, and FIG. 15 represents a time chart of the example in which an increase of the outside air temperature Te is seen.

Firstly, the example shown in FIG. 14 will be described. Since an execution condition that is the same as that according to the third embodiment is used, the water supply operation is started immediately after an engine stop as shown in FIG. 14. As a result, the cooler temperature Tc once increases while an increase thereof is suppressed by the effect of the water supply operation, and starts to decrease thereafter. Consequently, the time change rate dTc/dt shifts to a negative value from a positive value.

Since the cooler temperature Tc is higher than the cooling water temperature Tw in the course of the cooler temperature Tc continuously decreasing toward the outside air temperature Te (cooling water temperature Tw) immediately after an engine stop, a requirement that the time change rate dTc/dt is lower than or equal to the negative threshold value TH corresponds to the ending condition that is met in this course. During a time period that is affected by the residual heat of each of the residual gas in the intake air passage 12 and the cooling water, the cooler temperature Tc once starts to increase as shown in FIG. 14 after the water supply operation ends as a result of the W/P 62 stopping due to this ending condition. In accompaniment with this, the W/P 62 is actuated and the water supply operation is thus re-started. If the time change rate dTc/dt becomes lower than or equal to the threshold value TH again due to the re-start of the water supply operation, the water supply operation ends. While the effect of the residual heat described above is present, this kind of operation is repeated.

If the effect of the residual heat described above is eliminated thereafter, the cooler temperature Tc stops increasing as shown in FIG. 14 even when the water supply operation ends as a result of the ending condition (dTc/dt≤TH) being met, and, conversely, the cooler temperature Tc naturally decreases toward the outside air temperature Te. The water supply operation is re-started as a result of the execution condition being met in response to the natural decrease of this cooler temperature Tc, and, if the ending condition described above is met thereafter, this water supply operation ends. While the cooler temperature Tc has not yet reached the cooling water temperature Tw, this kind of operation is repeated. If the cooler temperature Tc reaches the cooling water temperature Tw thereafter when an engine soak is once completed, a series of water supply operations that have started immediately after the engine start-up ends.

Moreover, in the example shown in FIG. 14, when the outside air temperature Te decreases after an engine soak is once completed, the water supply operation is re-started since the execution condition described above is also met. In the course of the outside air temperature Te continuously decreasing in this way, the water supply operation ends as a result of any one of the ending condition (dTc/dt≤TH) and the ending condition (Tc=Tw) being met, as shown in FIG. 14. To be more specific, the example shown in FIG. 14 is illustrated such that, other than when the ending condition is met secondarily in this course, the water supply operation ends as a result of the ending condition (Tc=Tw) being met. Furthermore, if the cooler temperature Tc changes after each water supply operation ends and there is a gap between the cooler temperature Tc and the cooling water temperature Tw, the water supply operation is re-started since the execution condition is met. This kind of operation is repeated until the cooler temperature Tc converges to the cooling water temperature Tw (outside air temperature Te) as a result of the outside air temperature Te becoming unchanged.

Next, the example shown in FIG. 15 will be described. The start and end of a series of water supply operations performed immediately after an engine stop are the same as that in the example shown in FIG. 14. In the example shown in FIG. 15, when the outside air temperature Te increases after an engine soak is once completed, the water supply operation is re-started since the execution condition described above is also met. In the course of the outside air temperature Te continuously increasing in this way, the water supply operation basically ends as a result of the ending condition (Tc=Tw) that is one of the two ending conditions described above being met, as shown in FIG. 15. Furthermore, if the cooler temperature Tc changes after each water supply operation ends and there is a gap between the cooler temperature Tc and the cooling water temperature Tw, the water supply operation is re-started since the execution condition is met. This kind of operation is repeated until the cooler temperature Tc converges to the cooling water temperature Tw (outside air temperature Te) as a result of the outside air temperature Te becoming unchanged.

4-2. Advantageous Effects of Water Supply Operation According to Fourth Embodiment According to the control of the third embodiment described above, the water supply operation (actuation of the W/P 62) is continuously executed in both of a time period immediately after an engine stop and a time period after an engine soak is once completed. In contrast to this, according to the control of the present embodiment, the water supply operation (actuation of the W/P 62) is intermittently executed in both of a time period immediately after an engine stop and a time period after an engine soak is once completed. Thus, the occurrence of the dew condensation in the intake ports 50 can be reduced while lowering the power consumption of the W/P 62. In addition, the way of the intermittent driving of the W/P 62 can be changed by changing the magnitude of the negative threshold value TH. Therefore, it becomes possible to adjust the cooler temperature Tc by properly adjusting the magnitude of the threshold value TH.

4-3. Processing of ECU Concerning Water Supply Operation According to Fourth Embodiment FIG. 16 is a flow chart that illustrates a routine of the processing concerning the water supply operation according to the fourth embodiment of the present disclosure. The processing of steps S102, S106, S110, S300, S302 and S306 in the routine shown in FIG. 16 is as already described for the third embodiment.

Figure 16:
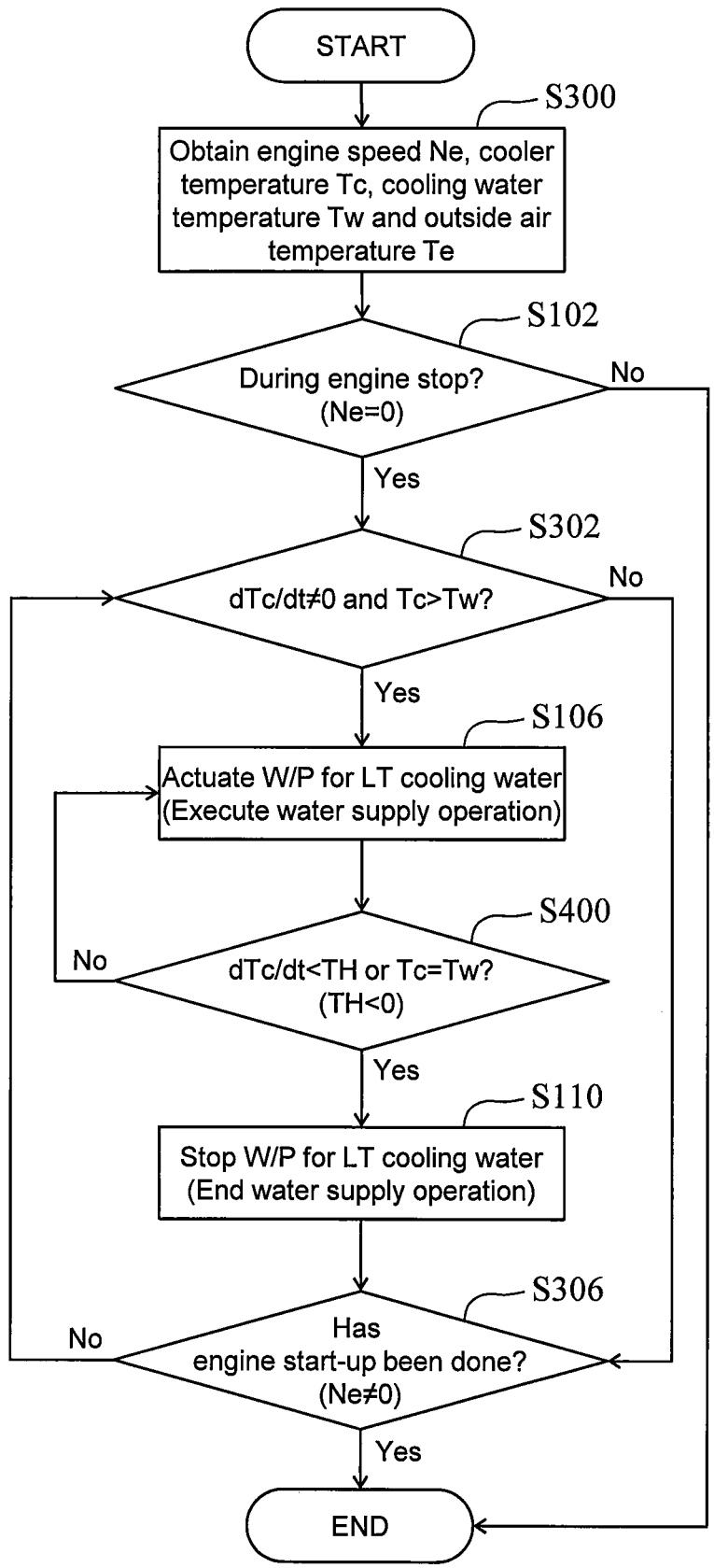
FIG. 16 is a flow chart that illustrates a routine of the processing concerning the water supply operation according to the fourth embodiment of the present disclosure.

According to the routine shown in FIG. 16, the ECU 40 proceeds to step S400 after the start of the water supply operation in step S106. In step S400, the ECU 40 determines whether or not the ending condition of the water supply operation is met. As already described, either the requirement that the time change rate dTc/dt is lower than or equal to the threshold value TH (negative value) described above or the requirement that the cooler temperature Tc is equal to the cooling water temperature Tw corresponds to this ending condition.

It should be noted that the cooling water temperature Tw used for the ending condition of step S400 may alternatively be substituted by the outside air temperature Te. That is, a requirement that the cooler temperature Tc is equal to or substantially equal to the cooling water temperature Tw may alternatively correspond to this ending condition as well as the requirement that the time change rate dTc/dt is lower than or equal to the threshold value TH (negative value) described above.

While the ending condition is not met in step S400, the ECU 40 returns to step S106 and continuously executes the water supply operation. If, on the other hand, the ending condition is met, the ECU 40 stops the actuation of the W/P 62 (i.e., ends the water supply operation) in step S110. It should be noted that, similarly to the routine shown in FIG. 13, in the processing of present routine, the water supply operation is also re-started as long as the execution condition is met again during an engine stop. It can therefore be said that the time to confirm the completion of the water supply operation in the example of the present routine is also when the next engine start-up is performed.

Fifth Embodiment

Next, a fifth embodiment according to the present disclosure will be described with reference to FIGS. 17 and 18.

5-1. Outline of Water Supply Operation According to Fifth Embodiment

Figure 17:
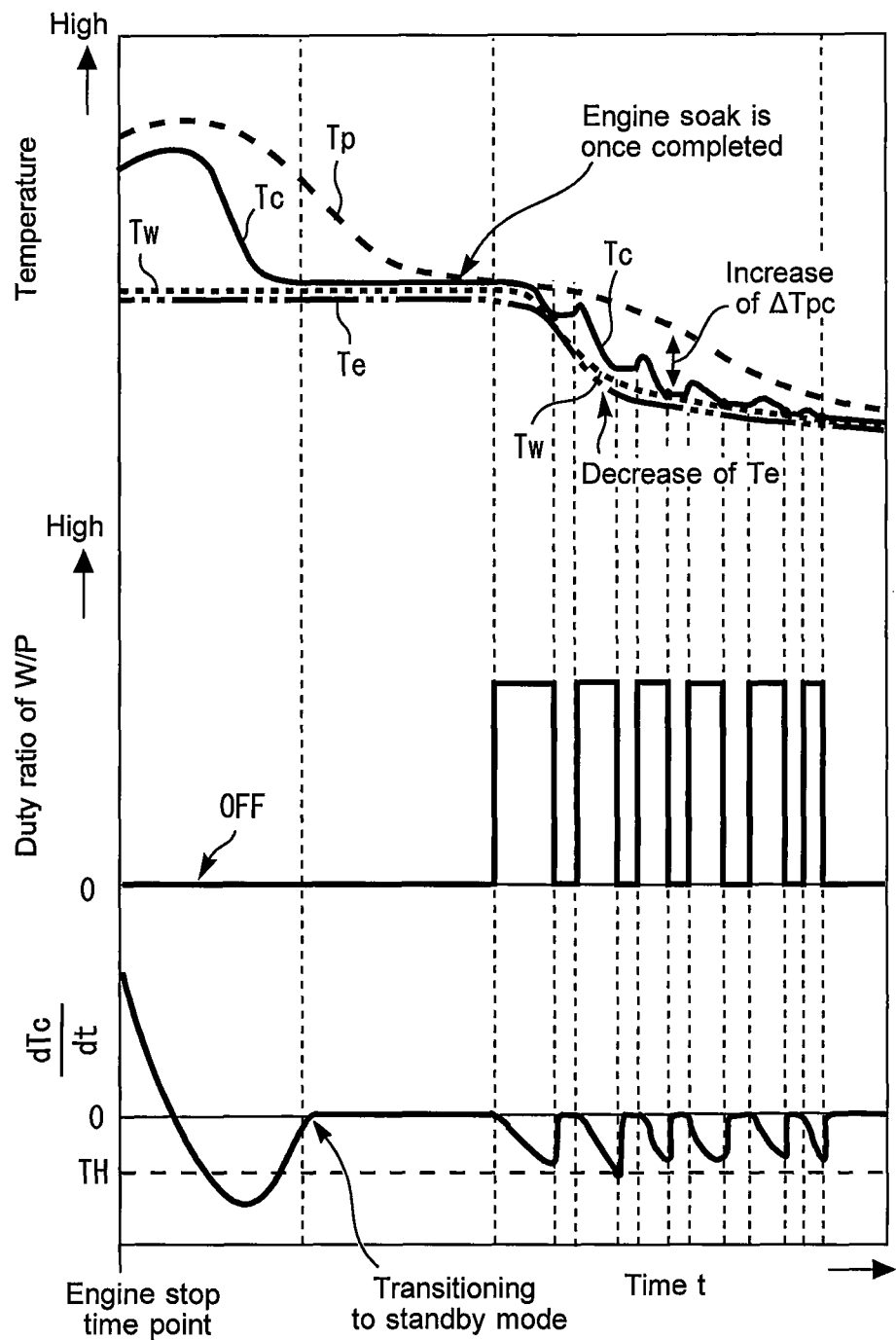
FIG. 17 is a time chart that illustrates the control of the W/P for a water supply operation according to a fifth embodiment of the present disclosure and an example of various temperature changes during an engine stop associated with this control.

FIG. 17 is a time chart that illustrates the control of the W/P 62 for the water supply operation according to the fifth embodiment of the present disclosure and an example of various temperature changes during an engine stop associated with this control. It should be noted that FIG. 17 represents an example in which a decrease of the outside air temperature Te is seen as an example of change of the outside air temperature Te after an engine soak is once completed.

As in the operation example shown in FIG. 17, the water supply operation according to the present embodiment is different from the water supply operation according to the fourth embodiment in terms of this not being executed during a time period from immediately after an engine stop until an engine soak is once completed.

In detail, in the present embodiment, the water supply operation is not executed, regardless of whether or not the execution condition is met, during a time period in which the cooler temperature Tc is not equal to the cooling water temperature Tw immediately after an engine stop (that is, a time period until an engine is once completed after an engine stop). In addition, the ECU 40 transitions to a standby mode when the cooler temperature Tc converges to the outside air temperature Te thereafter. The standby mode is continued until the execution condition of the water supply operation is met.

With the standby mode described above being utilized after an engine stop, it becomes possible to execute (start) the water supply operation following the execution condition (dTc/dt≠0 and Tc>Tw) being met after an engine soak is once completed (that is, after the cooler temperature Tc converges to the outside air temperature Te) after an engine stop.

5-2. Processing of ECU Concerning Water Supply Operation According to Fifth Embodiment FIG. 18 is a flow chart that illustrates a routine of the processing concerning the water supply operation according to the fifth embodiment of the present disclosure. The processing of steps S102, S106, S110, S300, S302, S306 and S400 in the routine shown in FIG. 18 is as already described for the fourth embodiment.

Figure 18:
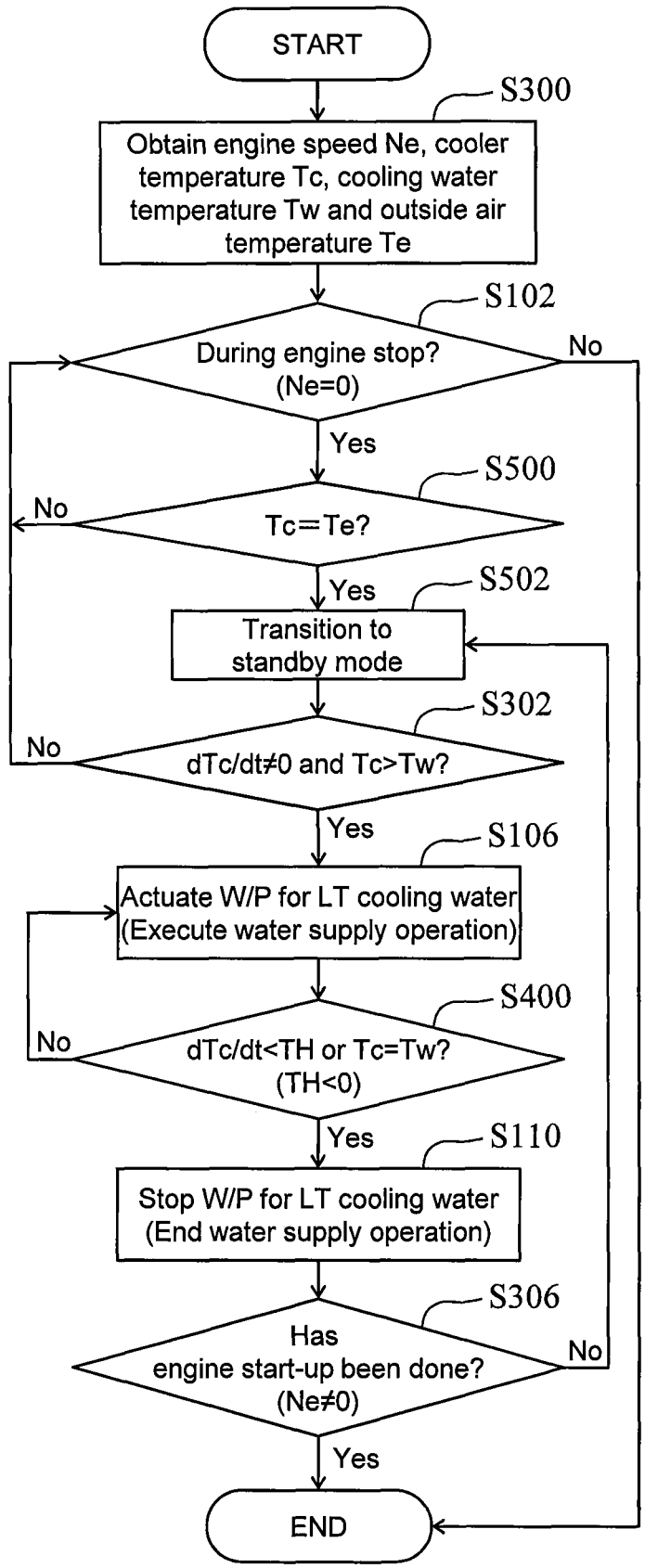
FIG. 18 is a flow chart that illustrates a routine of the processing concerning the water supply operation according to the fifth embodiment of the present disclosure.

According to the routine shown in FIG. 18, the ECU 40 proceeds to step S500 after determining in step S102 that the internal combustion engine 10 is in a stopped state. In step S500, the ECU 40 determines whether or not the cooler temperature Tc is equal to the outside air temperature Te. As a result, if the result of the determination of step S500 is negative, that is, if the cooler temperature Tc is not lower than the outside air temperature Te after an engine stop, the ECU 40 repeatedly executes the processing of step S102. It should be noted that, in this step S500, it may alternatively be determined whether or not the cooler temperature Tc is substantially equal to the outside air temperature Te (for example, whether or not the cooler temperature Tc falls within a predetermined range that includes the outside air temperature Te).

If, on the other hand, the result of the determination of step S500 is positive, that is, if the ECU 40 determines that the cooler temperature Tc has converged to the outside air temperature Te, the ECU 40 transitions to the standby mode (step S502). The ECU 40 continues the standby mode until the execution condition of step S302 is met thereafter.

It should be noted that the processing of step S400 in the routine shown in FIG. 18 may alternatively be substituted by the processing of step S304 in the routine shown in FIG. 13. That is, the water supply operation that is executed after the end of the standby mode may alternatively be continuously executed similarly to the operation examples shown in FIGS. 11 and 12, instead of an example in which it is intermittently executed similarly to the operation example shown in FIG. 17.

Other Embodiments

Other Examples of Execution of Water Supply Operation

Instead of the respective execution conditions for the first to fifth embodiments described above that utilize the time change rate dTc/dt of the cooler temperature Tc, only the requirement that the cooler temperature Tc is higher than the cooling water temperature Tw may be used as the execution condition of the "water supply operation" according to the present disclosure. That is, the water supply operation may alternatively be controlled so as to be executed when the cooler temperature Tc is higher than the cooling water temperature Tw during an engine stop and, on the other hand, not to be executed when the cooler temperature Tc is lower than or equal to the cooling water temperature Tw.

Furthermore, the water supply operation may alternatively be ended when an ending condition which means that the cooler temperature Tc is lower than or equal to the cooling water temperature Tw is met after the start of the water supply operation, and be re-started when the execution condition (Tc>Tw) is met again thereafter.

Other Examples of Water-Cooled Cooler

The "water-cooled cooler" according to the present disclosure is not limited to the intercooler 22 described above, as long as it is arranged at at least one of a portion of an intake air passage located on the upstream side of an intake port and an EGR passage. That is, another example of the cooler may be an EGR cooler arranged at an EGR passage. It should be noted that the EGR passage mentioned here includes not only the EGR passage 32 of the LPL type EGR device 30 described above but also an EGR passage of a high pressure loop (HPL) type EGR device and an EGR passage for a naturally aspirated engine.

Furthermore, another example of the cooler may be a water-cooled adaptor. To be more specific, the water-cooled adaptor is arranged between a cylinder head and an intake air pipe (intake manifold) and connects therewith. Also, there is formed inside the water-cooled adaptor, an internal intake air passage that is arranged between an internal intake air passage in the cylinder head (i.e., an internal passage of an intake port) and an internal intake air passage in the intake pipe. A wall surface of this internal intake air passage of the water-cooled adaptor can be cooled by a cooling water of the cooler.

Other Example of Cooling Water Circulation Loop

In the first to fifth embodiments described above, as an example of the cooling water circulation loop of a cooling water (LT cooling water) supplied to a water-cooled cooler (intercooler 22), the cooling water circulation loop 60 that is provided separately from the cooling water circulation loop for cooling the main body (engine main body) of the internal combustion engine 10 has been described. According to this kind of configuration, since the LT cooling water that is lower in temperature than the cooling water for cooling the engine main body can be utilized, a lot of opportunities to perform the water supply operation can be ensured during an engine stop. However, the cooling water circulation loop to supply a cooling water with a water-cooled cooer may not always be the cooling water circulation loop 60 described above, and, for example, a cooling water circulation loop for cooling the engine main body may alternatively be utilized.

The embodiments and modifications described above may be combined in other ways than those explicitly described above as required and may be modified in various ways without departing from the scope of the present disclosure.

What is claimed is:

1. A control device for an internal combustion engine, the internal combustion engine including:
   a water-cooled cooler arranged at at least one of a portion of an intake air passage located on an upstream side of an intake port and an EGR passage; and
   a water pump configured to supply a cooling water to the cooler,
   the control device being configured:
      to execute a water supply operation that supplies the cooling water to the cooler by actuating the water pump in response to an execution condition that a cooler temperature, that is a temperature of a wall of the cooler, is higher than a cooling water temperature that is a temperature of the cooling water that flows into the cooler, during stop of the internal combustion engine; and not start the water supply operation if the cooler temperature is lower than or equal to the cooling water temperature after the internal combustion engine is stopped.

2. The control device according to claim 1, wherein the control device is configured to end the water supply operation when, after the water supply operation starts, its end condition is met which includes a requirement that the cooler temperature is lower than or equal to the cooling water temperature, and to restart the water supply operation when the execution condition is met again thereafter.

3. The control device according to claim 1, wherein the execution condition of the water supply operation includes a requirement that a time change rate of the cooler temperature is positive as well as the requirement that the cooler temperature is higher than the cooling water temperature.

4. The control device according to claim 3, wherein an end condition of the water supply operation includes a requirement that the time change rate of the cooler temperature is zero or substantially zero.

5. The control device according to claim 3, wherein the control device is configured, until the time change rate of the cooler temperature shifts to a negative value, to repeatedly execute the water supply operation that utilizes its ending condition which includes a requirement that the time change rate of the cooler temperature is zero.

6. The control device according to claim 1, wherein the execution condition of the water supply operation includes a requirement that there is a time change of the cooler temperature as well as the requirement that the cooler temperature is higher than the cooling water temperature.

7. The control device according to claim 6, wherein an end condition of the water supply operation includes a requirement that a time change rate of the cooler temperature is zero, and a requirement that the cooler temperature is equal to or substantially equal to an outside air temperature or the cooling water temperature.

8. The control device according to claim 6, wherein an end condition of the water supply operation includes a requirement that a time change rate of the cooler temperature is lower than or equal to a negative threshold value, or a requirement that the cooler temperature is equal to or substantially equal to the cooling water temperature or an outside air temperature.

9. The control device according to claim 1, wherein the control device is configured to start the water supply operation when the execution condition is met after the cooler temperature converges to an outside air temperature after stop of the internal combustion engine.

* * * * *